US012795653B2

United States Patent
(12) United States Patent
Lei et al.

(10) Patent No.: US 12,795,653 B2
(45) Date of Patent: Nov. 10, 2026

(54) PHASE TRACKING REFERENCE SIGNAL CONFIGURATION FOR USER EQUIPMENT IN REDUCED CAPABILITY STATE

(71) Applicant: QUALCOMM Incorporated, San Diego, CA (US)

(72) Inventors: Jing Lei, San Diego, CA (US); Yu Zhang, San Diego, CA (US); Yeliz Tokgoz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 309 days.

(21) Appl. No.: 18/397,825

(22) Filed: Dec. 27, 2023

(65) Prior Publication Data

US 2024/0267912 A1 Aug. 8, 2024

Related U.S. Application Data

(60) Provisional application No. 63/482,811, filed on Feb. 2, 2023.

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/1273* (2013.01); *H04W 76/20* (2018.02)

(58) Field of Classification Search
CPC ......... H04W 72/1268; H04W 72/1273; H04W 76/20; H04W 76/27; H04L 5/0051; H04L 5/0048; H04L 5/0094
See application file for complete search history.

(56) References Cited

U.S. PATENT DOCUMENTS

2019/0379509 A1* 12/2019 Stauffer ................ H04L 5/0048
2022/0052808 A1* 2/2022 Shrivastava .......... H04L 5/0048
(Continued)

FOREIGN PATENT DOCUMENTS

WO 2019051085 A1 3/2019
WO 2022029039 A1 2/2022

OTHER PUBLICATIONS

3GPP TS 38.211: "3rd Generation Partnership Project, Technical Specification Group Radio Access Network, NR, Physical Channels and Modulation (Release 17)", Technical Specification, Mobile Competence Centre, 650, Route Des Lucioles, F-06921 Sophia-Antipolis Cedex, France, vol. RAN WG1, No. V17.4.0, Jan. 4, 2023, pp. 1-136, XP052234914, Dec. 2022, pp. 1-132, Sections 6.1, 6.4. 1.2, Sections 7.1, 7.4.1.2.
(Continued)

*Primary Examiner* — Kiet Tang
(74) *Attorney, Agent, or Firm* — Harrity & Harrity, LLP

(57) ABSTRACT

Various aspects of the present disclosure generally relate to wireless communication. In some aspects, a user equipment (UE) may receive signaling to operate in a radio resource control (RRC) inactive or idle state. The UE may receive a phase tracking reference signal (PTRS) configuration for a physical downlink shared channel (PDSCH) or physical uplink shared channel (PUSCH) communication when the UE is operating in the RRC inactive or idle state. Numerous other aspects are described.

27 Claims, 13 Drawing Sheets

(51) Int. Cl.
*H04W 72/1273* (2023.01)
*H04W 76/20* (2018.01)

(56) References Cited

U.S. PATENT DOCUMENTS

| | | | | |
|---|---|---|---|---|
| 2022/0322399 | A1* | 10/2022 | Kim | H04W 72/1273 |
| 2023/0224073 | A1* | 7/2023 | Xiong | H04B 17/318 370/329 |
| 2023/0337233 | A1* | 10/2023 | Zhou | H04L 5/0055 |
| 2025/0192947 | A1* | 6/2025 | Xiao | H04W 52/16 |

OTHER PUBLICATIONS

3GPP TS 38.214: "3rd Generation Partnership Project, Technical Specification Group Radio Access Network, NR, Physical layer procedures for data (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V17.4.0 (Dec. 2022), Jan. 4, 2023, pp. 1-230, XP052234919, Sections 5.1.6.3, 6.2.3.

International Search Report and Written Opinion—PCT/US2024/010659—ISA/EPO—Apr. 26, 2024.

* cited by examiner

PHASE TRACKING REFERENCE SIGNAL CONFIGURATION FOR USER EQUIPMENT IN REDUCED CAPABILITY STATE

CROSS-REFERENCE TO RELATED APPLICATION

This Patent Application claims priority to U.S. Provisional Patent Application No. 63/482,811, filed on Feb. 2, 2023, entitled "PHASE TRACKING REFERENCE SIGNAL CONFIGURATION FOR USER EQUIPMENT IN REDUCED CAPABILITY STATE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a phase tracking reference signal configuration for user equipments operating in a reduced capability state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving signaling to operate in a radio resource control (RRC) inactive or idle state. The method may include receiving a phase tracking reference signal (PTRS) configuration for a physical downlink shared channel (PDSCH) or physical uplink shared channel (PUSCH) communication when the UE is operating in the RRC inactive or idle state.

Some aspects described herein relate to a method of wireless communication performed by a network node. The method may include outputting or configuring signaling to operate a UE in an RRC inactive or idle state. The method may include outputting or configuring a PTRS configuration for a PDSCH or PUSCH communication when the UE is operating in the RRC inactive or idle state.

Some aspects described herein relate to a UE for wireless communication. The UE may include one or more memories and one or more processors coupled to the one or more memories. The one or more processors may be configured to receive signaling to operate in an RRC inactive or idle state. The one or more processors may be configured to receive a PTRS configuration for a PDSCH or PUSCH communication when the UE is operating in the RRC inactive or idle state.

Some aspects described herein relate to a network node for wireless communication. The network node may include one or more memories and one or more processors coupled to the one or more memories. The one or more processors may be configured to output or configure signaling to operate a UE in an RRC inactive or idle state. The one or more processors may be configured to output or configure a PTRS configuration for a PDSCH or PUSCH communication when the UE is operating in the RRC inactive or idle state.

Some aspects described herein relate to a non-transitory computer-readable medium that stores a set of instructions for wireless communication by a UE. The set of instructions, when executed by one or more processors of the UE, may cause the UE to receive signaling to operate in an RRC inactive or idle state. The set of instructions, when executed by one or more processors of the UE, may cause the UE to receive a PTRS configuration for a PDSCH or PUSCH communication when the UE is operating in the RRC inactive or idle state.

Some aspects described herein relate to a non-transitory computer-readable medium that stores a set of instructions for wireless communication by a network node. The set of instructions, when executed by one or more processors of the network node, may cause the network node to output or configure signaling to operate a UE in an RRC inactive or idle state. The set of instructions, when executed by one or more processors of the network node, may cause the network node to output or configure a PTRS configuration for a PDSCH or PUSCH communication when the UE is operating in the RRC inactive or idle state.

Some aspects described herein relate to an apparatus for wireless communication. The apparatus may include means for receiving signaling to operate in an RRC inactive or idle state. The apparatus may include means for receiving a PTRS configuration for a PDSCH or PUSCH communication when the apparatus is operating in the RRC inactive or idle state.

Some aspects described herein relate to an apparatus for wireless communication. The apparatus may include means for outputting or configuring signaling to operate a UE in an RRC inactive or idle state. The apparatus may include means for outputting or configuring a PTRS configuration for a PDSCH or PUSCH communication when the UE is operating in the RRC inactive or idle state.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 illustrates PTRS pilot signals for an orthogonal frequency division multiplexing with a cyclic prefix communication system.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
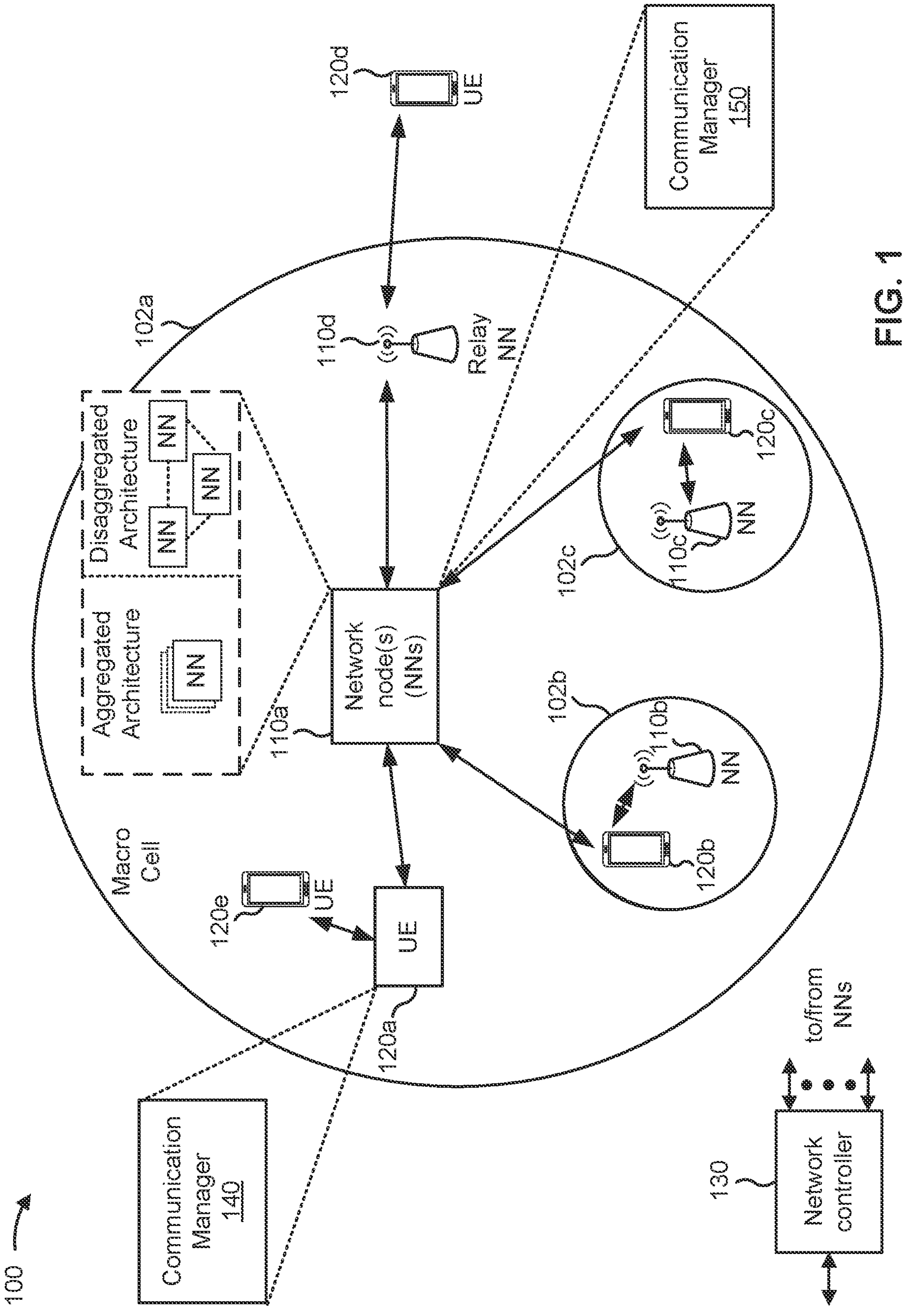
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a,* a network node 110*b,* a network node 110*c,* and a network node 110*d*), a user equipment (UE) 120 or multiple UEs 120 (shown as a UE 120*a,* a UE 120*b,* a UE 120*c,* a UE 120*d,* and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a,* the network node 110*b* may be a pico network node for a pico cell 102*b,* and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive signaling to operate in a radio resource control (RRC) inactive or idle state; and receive a phase tracking reference signal (PTRS) configuration for a physical downlink shared channel (PDSCH) or physical uplink shared channel (PUSCH) communication when the UE is operating in the RRC inactive or idle state. Additionally, or alternatively, the communication manager 140 may perform one or more other operations described herein.

In some aspects, the network node 110 may include a communication manager 150. As described in more detail elsewhere herein, the communication manager 150 may output or configure signaling to operate a UE in an RRC inactive or idle state; and output or configure a PTRS configuration for a PDSCH or PUSCH communication when the UE is operating in the RRC inactive or idle state. Additionally, or alternatively, the communication manager 150 may perform one or more other operations described herein.

As indicated above, FIG. 1 is provided as an example. Other examples may differ from what is described with regard to FIG. 1.

Figure 2:
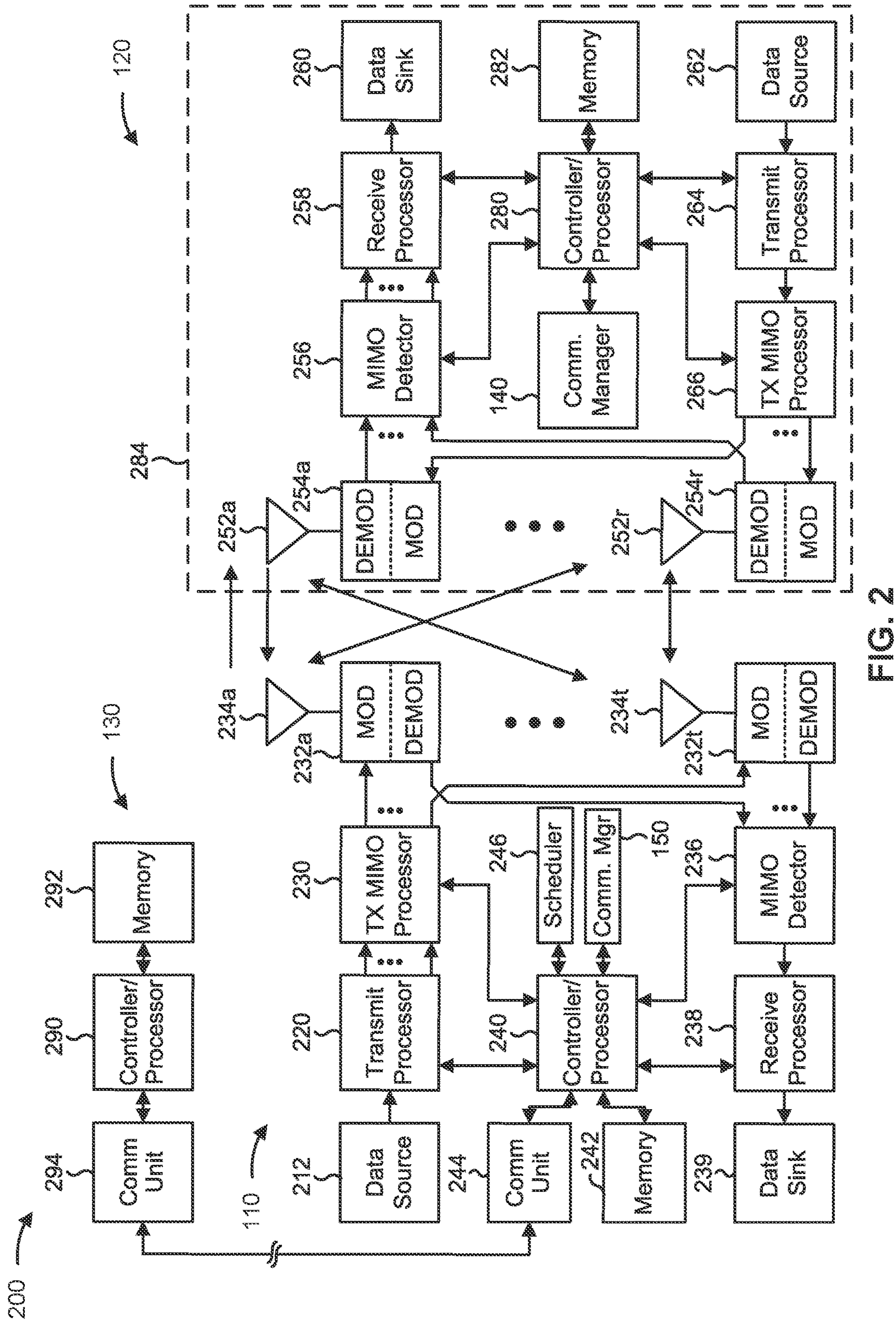
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with a PTRS configuration for UEs operating in a reduced capability state, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving signaling to operate in an RRC inactive or idle state; and/or means for receiving a PTRS configuration for a PDSCH or PUSCH communication when the UE is operating in the RRC inactive or idle state. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for outputting or configuring signaling to operate a UE in an RRC inactive or idle state; and/or means for outputting or configuring a PTRS configuration for a PDSCH or PUSCH communication when the UE is operating in the RRC inactive or idle state. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
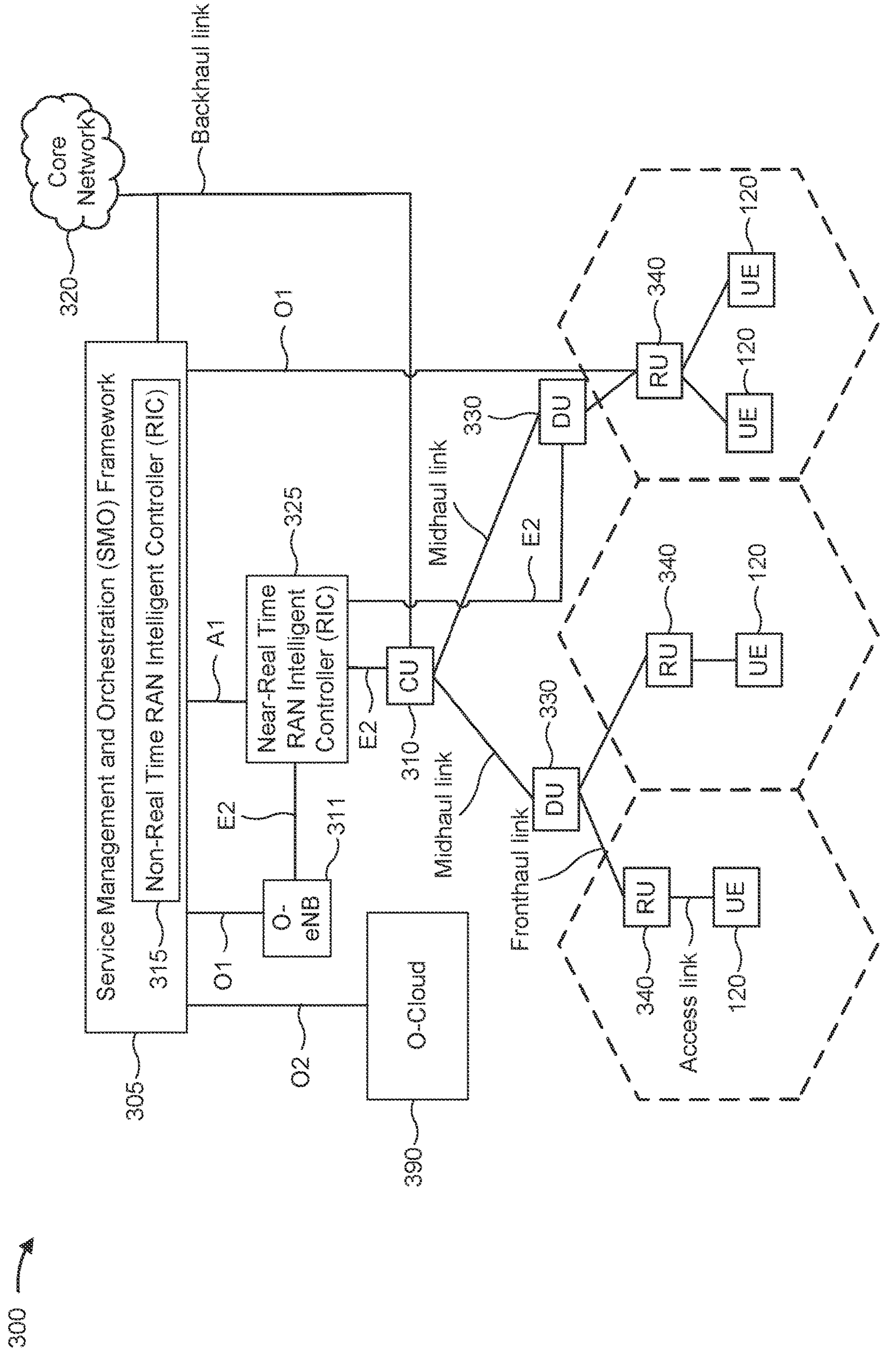
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
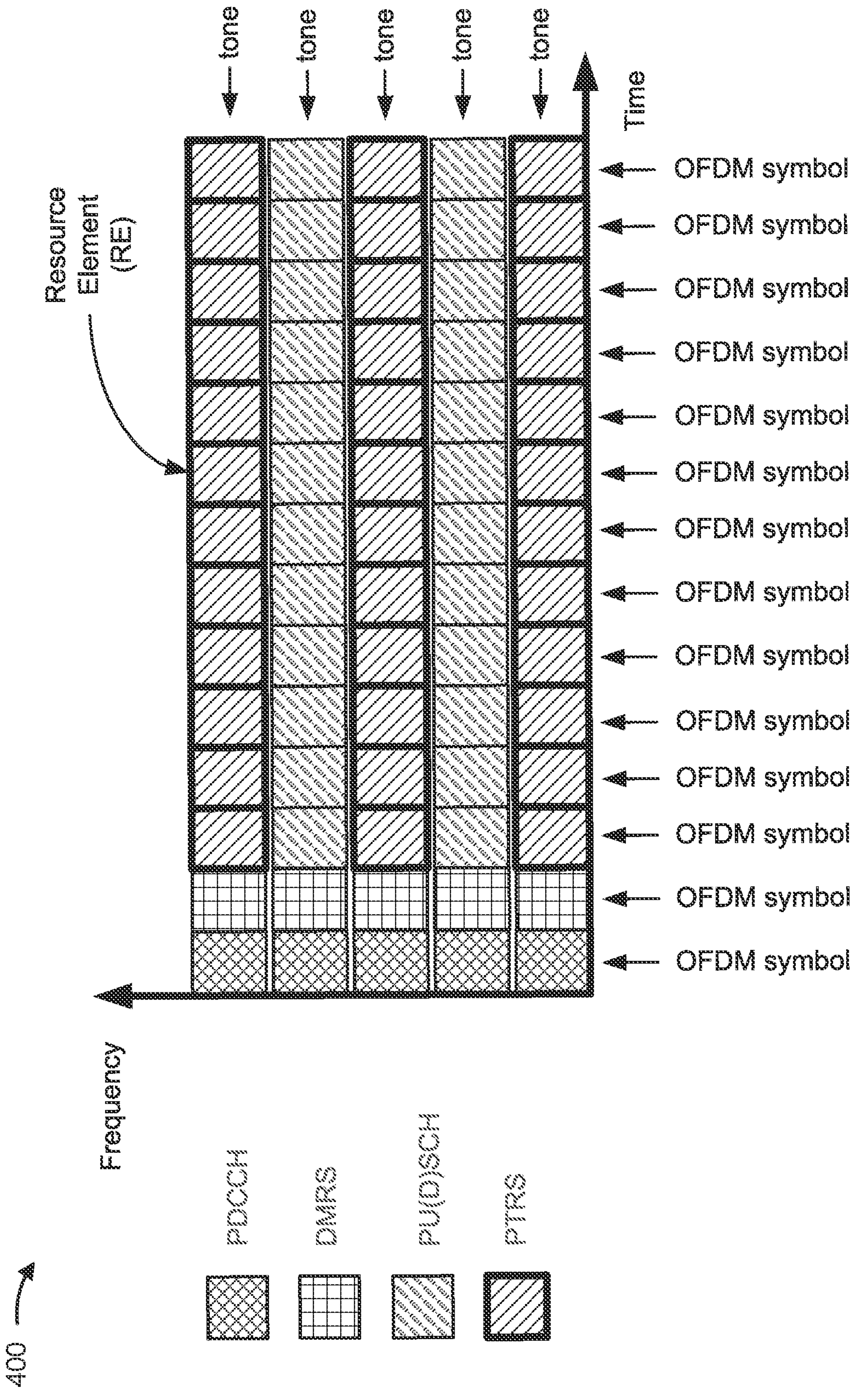
FIG. 4 is a diagram illustrating an example of an assignment of phase tracking reference signals (PTRSs) and other signals and channels to resource elements, in accordance with the present disclosure.

FIG. 4 is a diagram illustrating an example 400 of an assignment of PTRSs and other signals and channels to resource elements, in accordance with the present disclosure.

FIG. 4 illustrates PTRS pilot signals (also referred to as PTRS pilot tones) for an orthogonal frequency division multiplexing with a cyclic prefix (CP-OFDM) communication system. PTRS pilot signals may be continuous (as illustrated) or discontinuous in the time domain. For a UE 120, the PTRS signals may occupy one tone or several tones, based at least in part on a scheduled bandwidth, an MCS, a signal-to-noise ratio (SNR), an interference level, a port mapping, and/or another attribute that may impact the received signal quality of communication signals. A tone may be referred to as a subcarrier, in some examples.

PTRS pilot signals may be used by the UE 120 and/or the network node 110 for phase tracking, for phase estimation, and/or to correct oscillator phase noise, especially for millimeter wave communications. A PTRS may be embedded in a PDSCH resource allocation or a PUSCH allocation. In some cases, one PTRS port may be configured for downlink communication (e.g., within a PDSCH resource allocation), and up to two PTRS ports may be configured for uplink communication (e.g., within a PUSCH resource allocation). For CP-OFDM communication, a PTRS may use the same sequence as a corresponding DMRS, which may be a Gold sequence (e.g., a quadrature phase-shift keying (QPSK) modulated Gold sequence). In some examples, a correspondence between a PTRS port and a DMRS port may be indicated to the UE by a network node (e.g., via a DMRS-PTRS association indicated in downlink control information). In some cases, for uplink communications, a greater number of DMRS ports (e.g., up to 4 DMRS ports) may be configured for a UE than a number of PTRS ports (e.g., up to 2 PTRS ports) configured for the UE.

A higher SNR in the PTRS pilot signals may provide a more accurate phase error estimation. Accordingly, in some aspects, the PTRS pilot signals may be located in the tones with good channel conditions, high SNR, and/or high signal-to-interference-plus-noise ratio (SINR), which may result in more accurate phase tracking at the UE 120. Increasing the number of PTRS pilot signals may provide more accurate phase error estimation. For example, an increased number of PTRS pilot signals may allow for thermal noise to be averaged out over the larger number of PTRS pilot signals. Additionally, an increased number of PTRS pilot signals may allow for frequency diversity to be exploited.

However, using a large number of PTRS pilot signals may increase overhead. Furthermore, the gain from increasing the number of PTRS pilot signals may saturate for a given number of PTRS pilot signals in a scheduled bandwidth. Accordingly, UEs 120 with a large scheduled bandwidth may use a sparser PTRS frequency domain pattern. Conversely, UEs 120 with a small scheduled bandwidth may use a denser PTRS frequency domain pattern. PTRS may be relatively sparse in frequency compared to DMRS. For example, one PTRS resource element (RE) may be used in every 2 or 4 resource blocks (RBs), while 4 or 6 DMRS REs may be used in every RB. As shown in FIG. 4, PTRS may be relatively dense in time as compared to DMRS.

The required number of PTRS pilot signals to achieve a certain performance requirement (e.g., a bit error rate less than 0.5%, 1%, 2%, or another threshold), for a given scheduled bandwidth may depend on a number of factors, such as channel conditions, UE speed, UE capability, UE processing power, UE battery charge, mobility, and other factors that may impact a communication system's performance. A communication system with too few PTRS signals may result in more retransmissions due to channel errors, which reduces throughput. A system with too many PTRS signals may utilize valuable system bandwidth for a minimal decrease in channel error rate.

Some communication systems may use a fixed PTRS pattern (e.g., in the time domain and/or frequency domain), such as the PTRS pattern shown in FIG. 4. In this case, the density of PTRS pilot signals may be fixed both in the number of PTRS pilot signals and the resource elements that carry PTRS pilot signals. Alternatively, some communication systems may use a flexible PTRS configuration, where resource elements carrying PTRS pilot tones may be flexibly configured.

As indicated above, FIG. 4 is provided as an example. Other examples may differ from what is described with regard to FIG. 4.

Figure 5:
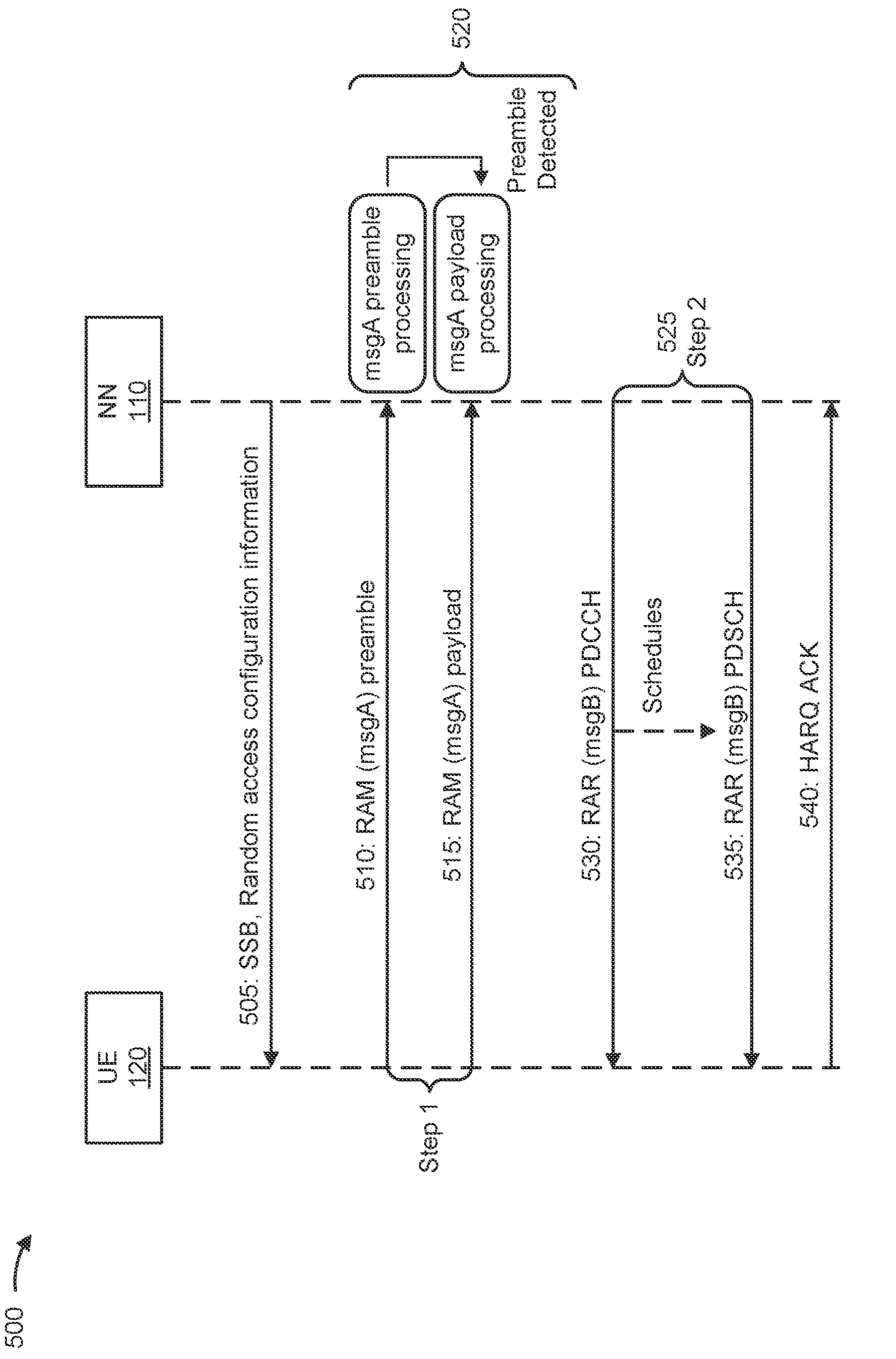
FIG. 5 is a diagram illustrating an example of a two-step random access procedure, in accordance with the present disclosure.

FIG. 5 is a diagram illustrating an example 500 of a two-step random access procedure, in accordance with the present disclosure. As shown in FIG. 5, a network node 110 and a UE 120 may communicate with one another to perform the two-step random access procedure.

As shown by reference number 505, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a random access channel (RACH) procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 510, the UE 120 may transmit, and the network node 110 may receive, a RAM preamble. As shown by reference number 515, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a PUSCH transmission).

As shown by reference number 520, the network node 110 may receive the RAM preamble transmitted by the UE 120. If the network node 110 successfully receives and decodes the RAM preamble, the network node 110 may then receive and decode the RAM payload.

As shown by reference number 525, the network node 110 may transmit an RAR (sometimes referred to as an RAR message). As shown, the network node 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 530, as part of the second step of the two-step random access procedure, the network node 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 535, as part of the second step of the two-step random access procedure, the network node 110 may transmit the PDSCH communication for the RAR, as scheduled by the PDCCH communication. The RAR may be included in a MAC protocol data unit (PDU) of the PDSCH communication. As shown by reference number 540, if the UE 120 successfully receives the RAR, the UE 120 may transmit a hybrid automatic repeat request (HARQ) acknowledgement (ACK).

As indicated above, FIG. 5 is provided as an example. Other examples may differ from what is described with regard to FIG. 5.

Figure 6:
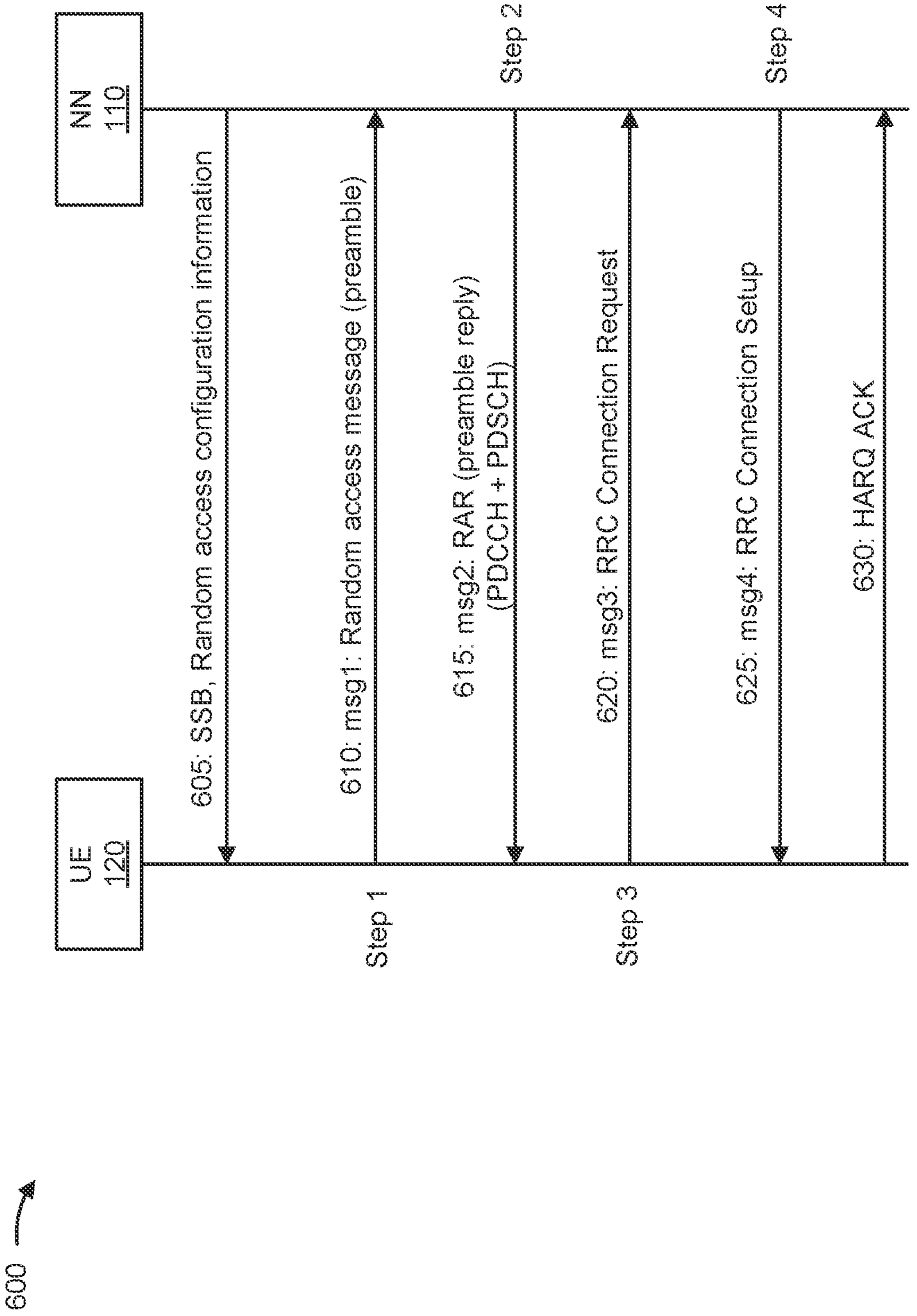
FIG. 6 is a diagram illustrating an example of a four-step random access procedure, in accordance with the present disclosure.

FIG. 6 is a diagram illustrating an example 600 of a four-step random access procedure, in accordance with the present disclosure. As shown in FIG. 6, a network node 110 and a UE 120 may communicate with one another to perform the four-step random access procedure.

As shown by reference number 605, the network node 110 may transmit, and the UE 120 may receive, one or more SSBs and random access configuration information. In some examples, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 615, the network node 110 may transmit an

RAR as a reply to the preamble. The message that includes the RAR may be referred to as message 2, msg2, MSG2, or a second message in a four-step random access procedure. In some examples, the RAR may indicate the detected random access preamble identifier (e.g., received from the UE 120 in msg1). Additionally, or alternatively, the RAR may indicate a resource allocation to be used by the UE 120 to transmit message 3 (msg3).

In some examples, as part of the second step of the four-step random access procedure, the network node 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC PDU of the PDSCH communication.

As shown by reference number 620, the UE 120 may transmit an RRC connection request message. The RRC connection request message may be referred to as message 3, msg3, MSG3, or a third message of a four-step random access procedure. In some examples, the RRC connection request may include a UE identifier, UCI, and/or a PUSCH communication (e.g., an RRC connection request).

As shown by reference number 625, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 630, if the UE 120 successfully receives the RRC connection setup message, the UE 120 may transmit a HARQ ACK.

As indicated above, FIG. 6 is provided as an example. Other examples may differ from what is described with regard to FIG. 6.

Figure 7:
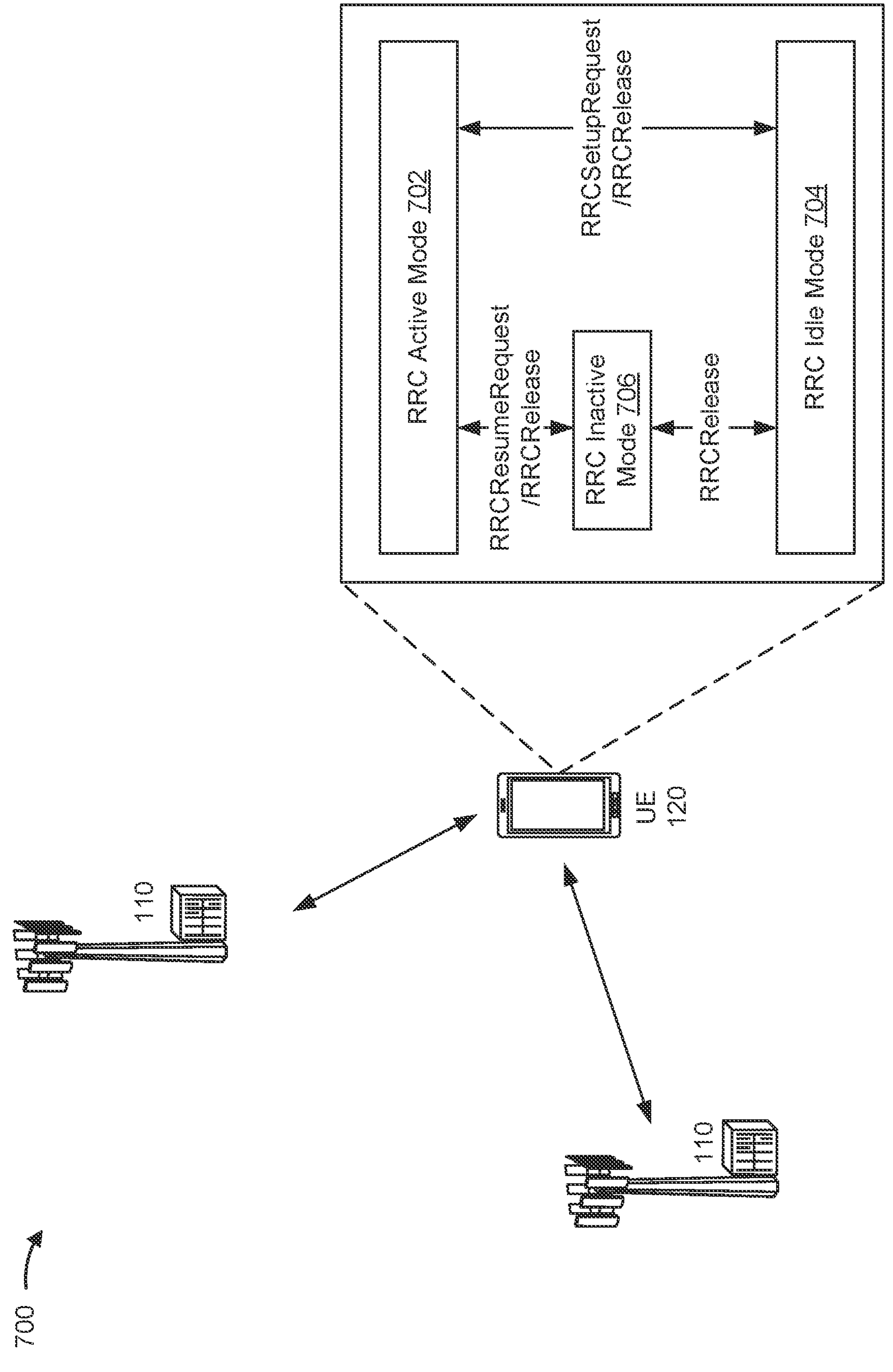
FIG. 7 illustrates an example of a wireless network in which a UE may support additional communication modes, in accordance with the present disclosure.

FIG. 7 illustrates an example 700 of a wireless network (e.g., wireless network 100) in which a UE (e.g., a UE 120) may support additional communication modes, in accordance with the present disclosure. The UE may be communicatively connected with one or more network nodes 110 in the wireless network. For example, the UE may be connected to the one or more network nodes 110 in a dual connectivity configuration. In this case, a first network node 110 may serve the UE as a master node and a second network node 110 may serve the UE as a secondary node.

As illustrated in FIG. 7, the UE may support a connected communication mode (e.g., an RRC active mode 702), an idle communication mode (e.g., an RRC idle mode 704), and an inactive communication mode (e.g., an RRC inactive mode 706). RRC inactive mode 706 may functionally reside between RRC active mode 702 and RRC idle mode 704.

The UE may transition between different modes based at least in part on various commands and/or communications received from the one or more network nodes 110. For example, the UE may transition from RRC active mode 702 or RRC inactive mode 706 to RRC idle mode 704 based at least in part on receiving an RRCRelease communication. As another example, the UE may transition from RRC active mode 702 to RRC inactive mode 706 based at least in part on receiving an RRCRelease with suspendConfig communication. As another example, the UE may transition from RRC idle mode 704 to RRC active mode 702 based at least in part on receiving an RRCSetupRequest communication. As another example, the UE may transition from RRC inactive mode 706 to RRC active mode 702 based at least in part on receiving an RRCResumeRequest communication.

When transitioning to RRC inactive mode 706, the UE and/or the one or more network nodes 110 may store a UE context (e.g., an access stratum (AS) context and/or higher-layer configurations). This permits the UE and/or the one or more network nodes 110 to apply the stored UE context when the UE transitions from RRC inactive mode 706 to RRC active mode 702 in order to resume communications with the one or more network nodes 110, which reduces latency of transitioning to RRC active mode 702 relative to transitioning to the RRC active mode 702 from RRC idle mode 704.

In some cases, the UE may communicatively connect with a new master node when transitioning from RRC idle mode 704 or RRC inactive mode 706 to RRC active mode 702 (e.g., a master node that is different from the last serving master node when the UE transitioned to RRC idle mode 704 or RRC inactive mode 706). In this case, the new master node may be responsible for identifying a secondary node for the UE in the dual connectivity configuration.

As indicated above, FIG. 7 is provided as an example. Other examples may differ from what is described with regard to FIG. 7.

When a UE is operating in a reduced capability state, such as the RRC inactive mode discussed above, certain capabilities of the UE may be limited, unavailable, or impractical while other capabilities remain enabled or possible. For example, while operating in a reduced capability state, the UE may be able to transmit and/or receive multiple data and/or control packages but may not be able to receive SSB and/or tracking reference signal (TRS) communications. Without SSB and/or TRS communications, the UE may not be able to transmit and/or receive data in a downlink bandwidth part. The UE may however, be able to perform random access procedures in an SSB-less initial bandwidth part without a TRS. The UE may further be able to engage in small data transmission (SDT), such as mobile-originating SDT (MO-SDT) or mobile-terminating SDT (MT-SDT) communications when operating in the reduced capability state. Certain reduced capability states, such as the RRC inactive mode or RRC idle mode, may further prevent the UE from receiving or applying a PTRS configuration. Without the PTRS configuration, the reliability of the PDSCH/PUSCH transmissions for UEs operating in a high spectrum and/or equipped with a noisy oscillator may be reduced. Moreover, common phase error and intercarrier interference may increase. Further, without the PTRS configuration, time/frequency tracking may prove challenging. In some instances, certain network components may be unable to engage in PTRS-based channel estimation and synchronization without the PTRS configuration.

Some techniques and apparatuses described herein enable receiving signaling to operate in an RRC inactive or idle state; and receiving a PTRS configuration for a PDSCH or PUSCH communication when the UE is operating in the RRC inactive or idle state. As a result, PTRS communications may be enabled for UEs operating in a reduced capability state, such as the RRC inactive mode or RRC idle mode. This can further improve the reliability of PDSCH/PUSCH transmissions for UEs operating in a high spectrum and/or equipped with a noisy oscillator (e.g., complementary metal-oxide-semiconductor (CMOS) devices with lower cost and/or lower power consumption). Some techniques and apparatuses described herein can lead to improved common phase error, improved intercarrier interference, and improved time/frequency tracking in an initial downlink bandwidth part without SSB and TRS signaling.

Some techniques and apparatuses described herein enable outputting or configuring signaling to operate a UE in an RRC inactive or idle state; and outputting or configuring a PTRS configuration for a PDSCH or PUSCH communication when the UE is operating in the RRC inactive or idle state. As a result, the network entity can configure the UE to receive PTRS communications while the UE is operating in the reduced capability state, such as the RRC inactive mode or the RRC idle mode. Moreover, the techniques and apparatuses described herein may improve spectral efficiency of multiple procedures performed while the UE is operating in, for example, an RRC inactive mode or an RRC idle mode, including MO-SDT communications, MT-SDT communications, multicast and broadcast services (MBS) communications, a combination thereof, and/or the like. Further, the techniques and apparatuses described herein provide interference randomization/averaging for PTRS-based channel estimation and synchronization.

Figure 8:
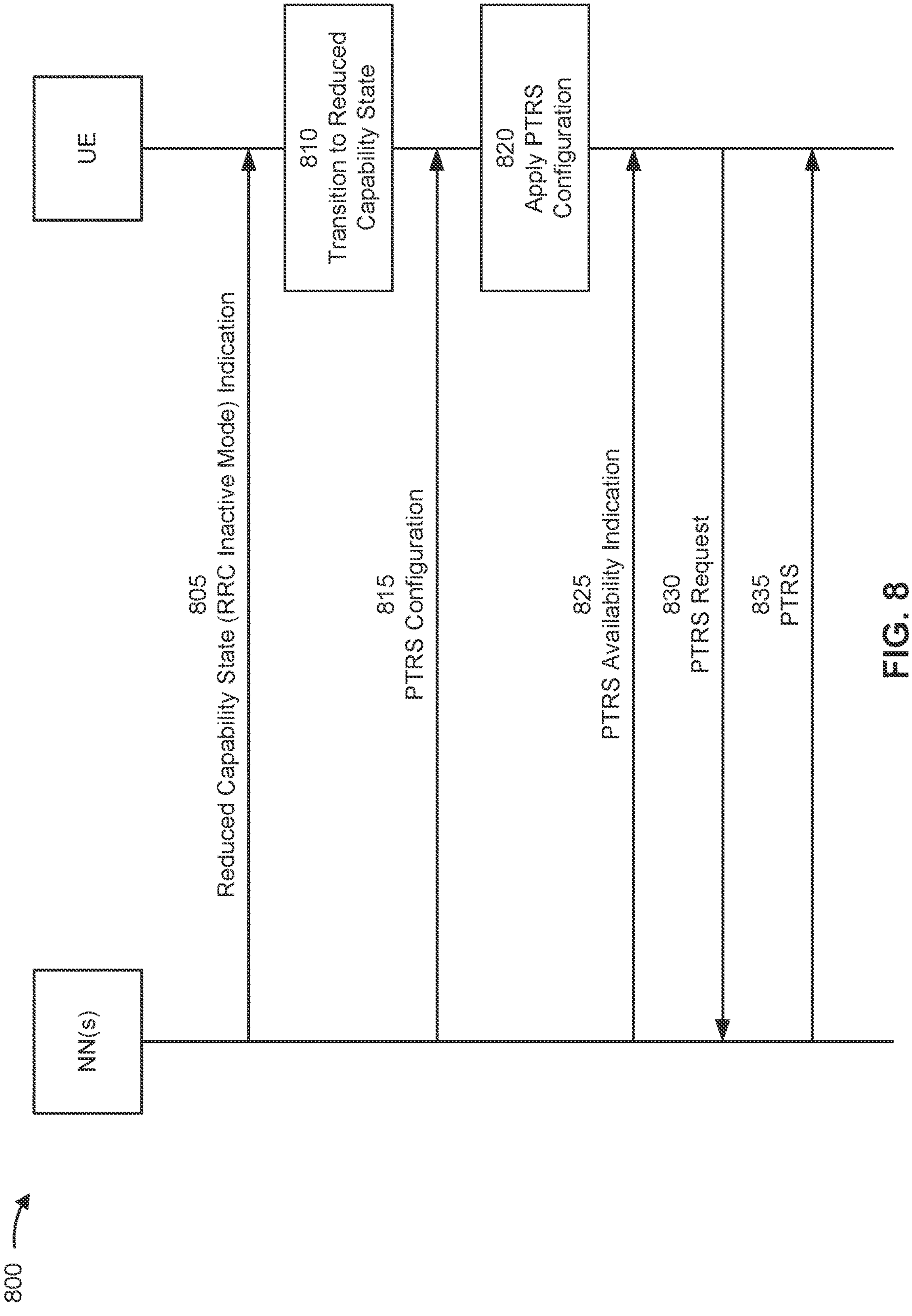
FIG. 8 is a diagram illustrating an example associated with PTRS configurations for UEs operating in a reduced capability state, in accordance with the present disclosure.

FIG. 8 is a diagram illustrating an example 800 associated with PTRS configurations for UEs operating in a reduced capability state, in accordance with the present disclosure. As shown in FIG. 8, a network node (e.g., network node 110) and a UE (e.g., UE 120) may communicate with one another.

As shown by reference number 805, the network node may transmit, and the UE may receive, an instruction to operate in a reduced capability state, such as an RRC inactive mode or an RRC idle mode. The instruction to operate in the reduced capability state may be transmitted to the UE via RRC signaling. For example, the instruction to operate in the reduced capability state may include an RRCRelease with or without a suspendConfig communication.

As shown by reference number 810, the UE may transition to the reduced capability state, such as the RRC inactive mode or the RRC idle mode. As discussed above, when transitioning to the RRC inactive mode, the UE and/or network node may store a UE context (e.g., an AS context and/or higher-layer configurations), which permits the UE and/or the network node to apply the stored UE context when the UE transitions from the RRC inactive mode to the RRC active mode and resume full capability communications with the network node.

As shown by reference number 815, the network node may transmit, and the UE may receive, a PTRS configuration. In some aspects, the signaling at reference number 805 includes the PTRS configuration. In some aspects, the PTRS configuration is transmitted by the network node via unicast RRC signaling, a multicast or groupcast message, a system information broadcast, an on-demand transmission (e.g., requested by the UE, as discussed below with respect to reference number 830), a SIB configured for positioning, sensing, measuring reporting, paging, or joint communication and sensing, and/or a combination thereof, among other examples.

In some aspects, the PTRS configuration is associated with an SDT configuration for MO-SDT, MT-SDT, and/or a combination thereof, among other examples. The SDT configuration may be received via RRC signaling.

In some aspects, the PTRS configuration is based, at least in part, on one or more of a time density, a frequency density, a mapping rule to radio resources in time/frequency/space domains, a power allocation scheme, an antenna port association with DMRS of PDSCH or PUSCH transmission, a threshold or range for a modulation coding scheme, a threshold or range for subcarrier spacing, or a threshold or range for bandwidth of the PDSCH or PUSCH communication.

In some aspects, the PTRS configuration includes one or more procedure configurations such a configurations for one or more UE-specific procedures, UE group-specific procedures, cell-specific procedures, area-specific procedures, and/or a combination thereof, among other examples. In some aspects, the procedure configurations include one or more of a contention based random access (CBRA) procedure, an SDT procedure, a positioning procedure, a sensing procedure, a joint sensing and communication procedure, a measurement or report procedure, a paging procedure, a multicast and broadcast services procedure, or a combination thereof, among other examples. One or more of the procedure configurations may be transmitted by the network via, for example, unicast RRC signaling, a multicast message, a groupcast message, a system information on-demand transmission (which could be a unicast, multicast, or group cast transmission), and/or a combination thereof, among other examples.

In some aspects, the PTRS configuration includes one or more of a reference resource block index, a reference resource element index, a reference symbol index, or a resource element offset, one or more of which may be configured as a function of an identifier associated with the UE. The identifier associated with the UE may be one or more of a radio network temporary identifier (RNTI) or a common control channel (CCC) message. Examples of an RNTI may include a cell RNTI, a configured scheduling RNTI, or an inactive RNTI. In some aspects, one or more of the reference resource block index, the reference resource element index, the reference symbol index, or the resource element offset may be configured as a function of a group radio network temporary identifier scheduling PDSCH.

In some aspects, the PTRS configuration is based, at least in part, on a mapping pattern to time and frequency resources allocated for PDSCH or PUSCH communications. In some aspects, the mapping pattern defines a PTRS frequency density (e.g., a density of the frequency of the signals used for PTRS communications) that is less than a DMRS frequency density (e.g., the frequency density of the DMRS associated with the PDSCH or PUSCH communications in the RRC inactive mode or RRC idle mode). In some aspects, the PTRS frequency density and/or PTRS time density may be based, at least in part, on one or more of a UE capability, an MCS, a bandwidth allocation, a sub-carrier spacing, a frequency range, an availability or duty cycle of an SSB, or an availability or duty cycle of a TRS. In some aspects, the PTRS frequency density is less than or equal to a TRS frequency density. In instances where the TRS and/or SSB are not transmitted in the active DL bandwidth part, the PTRS communication can be configured with a higher time/frequency density to assist with DL/UL synchronization. In some aspects, mapping pattern includes a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, a resource mapping between PTRS and DMRS communication, and/or a combination thereof, among other examples.

As shown by reference number 820, the UE may apply the PTRS configuration. By applying the PTRS configuration, the UE may receive PTRS communications despite operating in the reduced capability state, such as the RRC inactive mode or RRC idle mode.

As shown by reference number 825, the network node may transmit, and the UE may receive, a PTRS availability indication. In some aspects, the PTRS availably indication may be transmitted by the network node via RRC signaling, MAC control element (CE) (MAC-CE) signaling, RAR signaling, DCI signaling, a combination thereof, and/or the like.

As shown by reference number 830, the UE may transmit, and the network node may receive, a PTRS request. The UE may transmit the PTRS request via RRC signaling, MAC-CE signaling, a random access message, a random access preamble, a reference signal, UCI signaling, a combination thereof, and/or the like. In some aspects, the PTRS request may include a request to modify the PTRS configuration. Alternatively, in some aspects, the PTRS request may include a request for the network node to send the PTRS or the PTRS configuration. In some aspects, the PTRS request may be transmitted by the UE before reference number 815. Alternatively, in some aspects, the PTRS request may include a request to suspend availability of the PTRS. In some aspects, the PTRS request is indicated by the UE via UE assistance information signaling. In some aspects, the PTRS request is transmitted via UCI on a dedicated physical uplink control channel (PUCCH) resource set. In some aspects, the PTRS request is multiplexed with the PUSCH communication.

In some aspects, the UE may transmit, and the network node may receive, a phase noise estimate. In some aspects, the UE transmits the phase noise estimate with the PTRS request. The phase noise estimate may be based, at least in part, on one or more of a DMRS configured for DL control or data communication, an initial PTRS configuration, channel state information (CSI), RSSI, a SINR, other measurements related to the PTRS configuration in subsequent PDSCH/PUSCH scheduling, a combination thereof, and/or the like.

As shown by reference number 835, the network node may transmit, and the UE may receive, the PTRS or a communication including the PTRS. The UE may receive the PTRS while still operating in the reduced capability state, such as the RRC inactive mode or the RRC idle mode.

Accordingly, the UE may be configured to receive PTRS communications despite operating in a reduced capability state, such as the RRC inactive mode or the RRC idle mode.

As indicated above, FIG. 8 is provided as an example. Other examples may differ from what is described with respect to FIG. 8.

Figure 9:
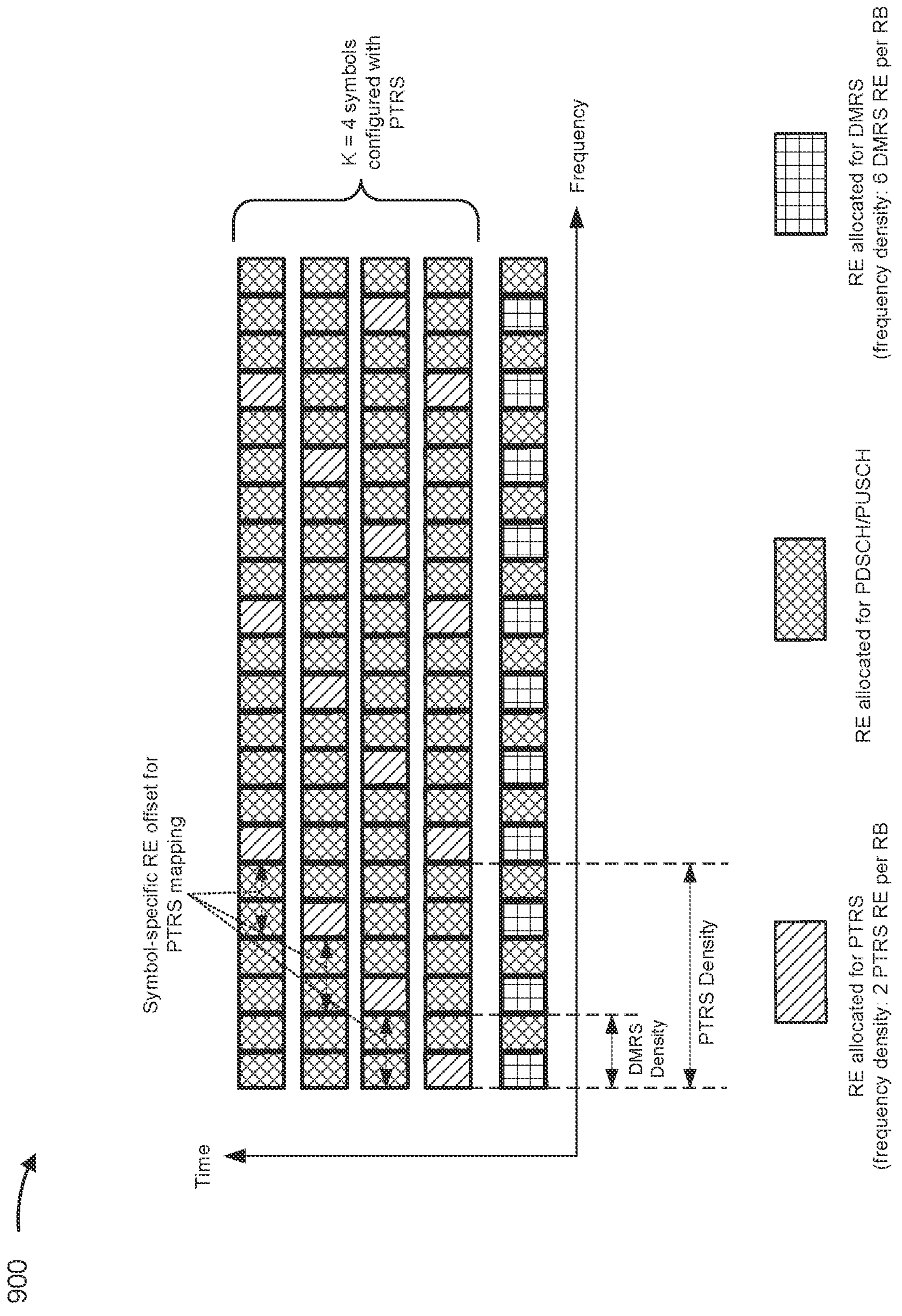
FIG. 9 is a diagram illustrating an example PTRS mapping associated with a PTRS configuration for a UE operating in a reduced capability state, in accordance with the present disclosure.

FIG. 9 is a diagram illustrating an example 900 associated with a PTRS configuration for a UE operating in a reduced capability state, in accordance with the present disclosure. As shown in FIG. 9, example 900 includes a PTRS mapping pattern, such as the mapping pattern discussed above with respect to FIG. 8.

In the example 900, frequency of the PTRS communication is shown along the x-axis and time is shown along the y-axis. As shown, four symbols are configured for PTRS communication. As discussed above, the PTRS frequency may be a function of DMRS frequency. As shown in the example 900 of FIG. 9, the resource elements allocated for DMRS communications have a frequency density of 6 DMRS resource elements per resource block. As shown in the example 900 of FIG. 9, the resource elements allocated for PTRS communications have a frequency density of two PTRS resource elements per resource block. Accordingly, the PTRS frequency density is less than the DMRS frequency density.

In some aspects, a resource element offset is applied to the PTRS communications. In the example 900 of FIG. 9, the resource element offset is two resource elements along the frequency axis. Accordingly, the PTRS communication in one symbol may occur at a frequency two resource elements lower than the next PTRS communication in the next symbol. For instance, if a PTRS communication in a first symbol occurs at a first frequency, the next PTRS communication in a second symbol may occur at a second frequency, and the second frequency may be two resource elements higher in frequency than the first frequency.

In some aspects, PTRS communications may occur at the same frequency across different symbols. As shown in the example 900 of FIG. 9, PTRS communications in a first symbol occur at a first and seventh frequency resource element, among other resource elements. PTRS communications in a second symbol occur at a third and ninth frequency resource element, among other resource elements. PTRS communications in a third symbol occur at a fifth and $11^{th}$ frequency resource element, among other resource elements. PTRS communications in a fourth symbol occur at the seventh and $13^{th}$ frequency resource element, among other resource elements. Accordingly, one of the PTRS communications from the first symbol occurs at the same frequency as one of the PTRS communications from the fourth symbol, albeit at different times.

As indicated above, FIG. 9 is provided as an example. Other examples may differ from what is described with respect to FIG. 9.

Figure 10:
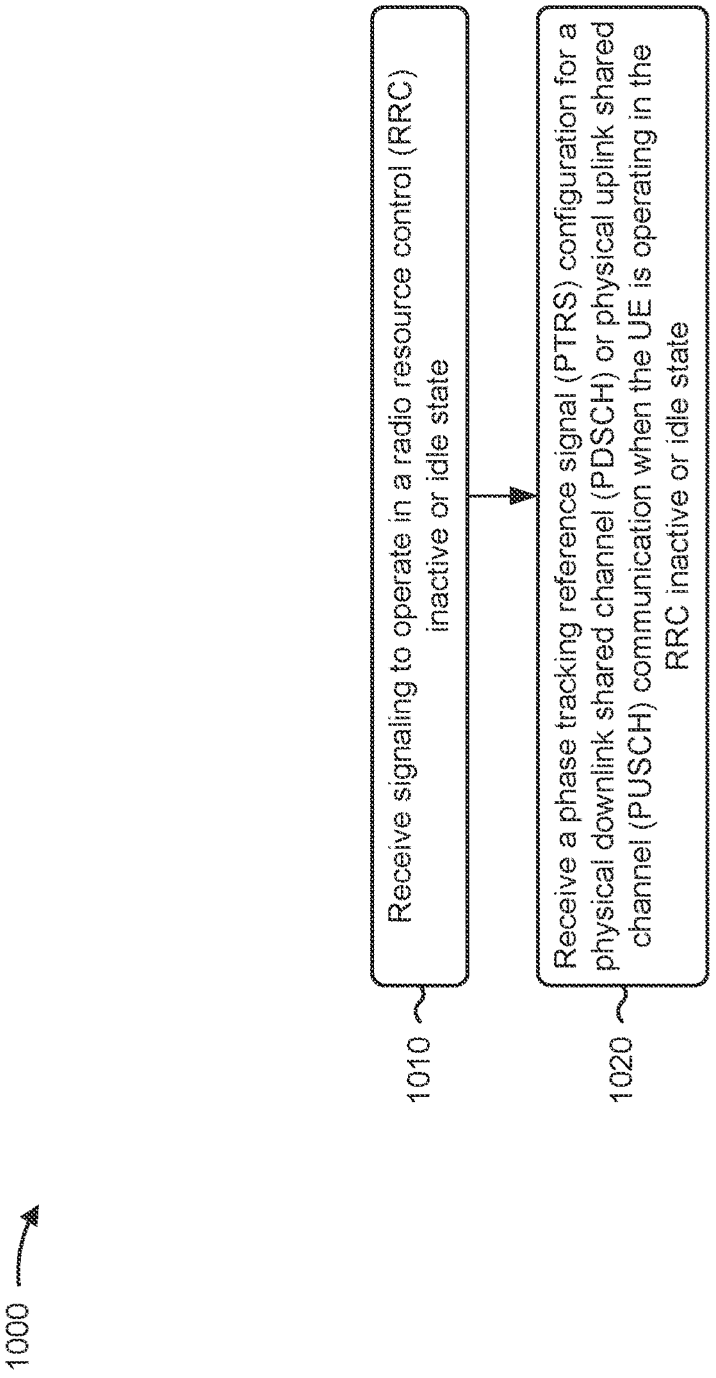
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a PTRS configuration for a UE operating in a reduced capability state.

As shown in FIG. 10, in some aspects, process 1000 may include receiving signaling to operate in an RRC inactive or idle state (block 1010). For example, the UE (e.g., using reception component 1202 and/or communication manager 1206, depicted in FIG. 12) may receive signaling to operate in an RRC inactive or idle state, as described above.

As further shown in FIG. 10, in some aspects, process 1000 may include receiving a PTRS configuration for a PDSCH or PUSCH communication when the UE is operating in the RRC inactive or idle state (block 1020). For example, the UE (e.g., using reception component 1202 and/or communication manager 1206, depicted in FIG. 12) may receive a PTRS configuration for a PDSCH or PUSCH communication when the UE is operating in the RRC inactive or idle state, as described above.

Process 1000 may include additional aspects, such as any single aspect or any combination of aspects described below and/or in connection with one or more other processes described elsewhere herein.

In a first aspect, the PTRS configuration is based, at least in part, on one or more of a time density, a frequency density, a mapping rule to radio resources in one or more of a time domain, a frequency domain, or a space domain, a power allocation scheme, an antenna port association with a DMRS of the PDSCH or PUSCH communication, a threshold or range for a modulation coding scheme, a threshold or range for subcarrier spacing, or a bandwidth threshold or range for the PDSCH or PUSCH communication.

In a second aspect, alone or in combination with the first aspect, the signaling to operate in the RRC inactive or idle state includes the PTRS configuration.

In a third aspect, alone or in combination with one or more of the first and second aspects, the PTRS configuration is transmitted via unicast RRC signaling.

In a fourth aspect, alone or in combination with one or more of the first through third aspects, the PTRS configuration is transmitted via one or more of a multicast or groupcast message.

In a fifth aspect, alone or in combination with one or more of the first through fourth aspects, the PTRS configuration is transmitted via a system information broadcast or on-demand transmission.

In a sixth aspect, alone or in combination with one or more of the first through fifth aspects, the PTRS configuration is transmitted via two or more of unicast RRC signaling, a multicast message, a groupcast message, or a system information broadcast or on-demand transmission.

In a seventh aspect, alone or in combination with one or more of the first through sixth aspects, the PTRS configuration is associated with an SDT configuration for one or more of uplink or downlink communications.

In an eighth aspect, alone or in combination with one or more of the first through seventh aspects, the SDT configuration is transmitted via RRC signaling.

In a ninth aspect, alone or in combination with one or more of the first through eighth aspects, the PTRS configuration is associated with one or more UE-specific procedure, UE group-specific procedure, cell-specific procedure, or area-specific procedure performed in the RRC inactive or idle state.

In a tenth aspect, alone or in combination with one or more of the first through ninth aspects, the one or more UE-specific procedure, UE group-specific procedure, cell-specific procedure, or area-specific procedure include one or more of a CBRA procedure, an SDT procedure, a positioning procedure, a sensing procedure, a joint sensing and communication procedure, a measurement or report procedure, a paging procedure, or a multicast and broadcast services procedure.

In an eleventh aspect, alone or in combination with one or more of the first through tenth aspects, configurations associated with the one or more UE-specific procedure, UE group-specific procedure, cell-specific procedure, or area-specific procedure are received via one or more of unicast RRC signaling, a multicast message, a groupcast message, a system information on-demand transmission, or a system information broadcast.

In a twelfth aspect, alone or in combination with one or more of the first through eleventh aspects, the PTRS configuration includes one or more of a reference resource block index, a reference resource element index, a reference symbol index, or a resource element offset.

In a thirteenth aspect, alone or in combination with one or more of the first through twelfth aspects, one or more of the reference resource block index, the reference resource element index, the reference symbol index, or the resource element offset are configured as a function of an identifier associated with the UE.

In a fourteenth aspect, alone or in combination with one or more of the first through thirteenth aspects, the identifier associated with the UE includes one or more of a RNTI or a common control channel message.

In a fifteenth aspect, alone or in combination with one or more of the first through fourteenth aspects, the RNTI is one or more of a cell RNTI, a configured scheduling RNTI, or an inactive RNTI.

In a sixteenth aspect, alone or in combination with one or more of the first through fifteenth aspects, one or more of the reference resource block index, the reference resource element index, the reference symbol index, or the resource element offset are configured as a function of a group radio network temporary identifier scheduling physical downlink shared channel.

In a seventeenth aspect, alone or in combination with one or more of the first through sixteenth aspects, process 1000 includes receiving a PTRS availability indication via radio resource control signaling, medium access control layer control element signaling, random access response signaling, or downlink control information signaling.

In an eighteenth aspect, alone or in combination with one or more of the first through seventeenth aspects, process 1000 includes transmitting a request for the PTRS.

In a nineteenth aspect, alone or in combination with one or more of the first through eighteenth aspects, the request for the PTRS is transmitted through one or more of radio resource control signaling, medium access control layer control element signaling, a random access message, a random access preamble, a reference signal, or uplink control information signaling.

In a twentieth aspect, alone or in combination with one or more of the first through nineteenth aspects, the request for the PTRS includes one of a request for the PTRS configuration or transmission of the PTRS, a request to modify the PTRS configuration, or a request to suspend availability of the PTRS.

In a twenty-first aspect, alone or in combination with one or more of the first through twentieth aspects, the request for PTRS is indicated via UE assistance information.

In a twenty-second aspect, alone or in combination with one or more of the first through twenty-first aspects, the request for PTRS is indicated via uplink control information.

In a twenty-third aspect, alone or in combination with one or more of the first through twenty-second aspects, the request for PTRS is transmitted via uplink control information on a dedicated physical uplink control channel resource set or multiplexed with the PUSCH communication.

In a twenty-fourth aspect, alone or in combination with one or more of the first through twenty-third aspects, process 1000 includes transmitting a phase noise estimate based, at least in part, on one or more of a demodulation reference signal configured for a downlink control or data communication, an initial PTRS configuration, channel state information, a received signal strength indicator, or a signal-to-interference-plus-noise ratio.

In a twenty-fifth aspect, alone or in combination with one or more of the first through twenty-fourth aspects, the PTRS configuration is received via a system information block configured for one or more of positioning, sensing, measuring, reporting, paging, or joint communication and sensing.

In a twenty-sixth aspect, alone or in combination with one or more of the first through twenty-fifth aspects, the PTRS configuration is based, at least in part, on a mapping pattern to time and frequency resources allocated for the PDSCH or PUSCH communication.

In a twenty-seventh aspect, alone or in combination with one or more of the first through twenty-sixth aspects, the mapping pattern defines a PTRS frequency density that is less than a frequency density of a DMRS of the PDSCH or PUSCH communication in the RRC inactive or idle state.

In a twenty-eighth aspect, alone or in combination with one or more of the first through twenty-seventh aspects, one or more of the PTRS frequency density or a PTRS time density are based, at least in part, on one or more of a UE capability, a modulation coding scheme, a bandwidth allocation, a sub-carrier spacing, a frequency range, availability or duty cycle of a synchronization signal block, or availability or duty cycle of a tracking reference signal.

In a twenty-ninth aspect, alone or in combination with one or more of the first through twenty-eighth aspects, one or more of the PTRS frequency density or PTRS time density are based, at least in part, on an availability or duty cycle of a synchronization signal block or an availability or duty cycle of a tracking reference signal.

In a thirtieth aspect, alone or in combination with one or more of the first through twenty-ninth aspects, the PTRS frequency density is less than or equal to a frequency density of a tracking reference signal.

In a thirty-first aspect, alone or in combination with one or more of the first through thirtieth aspects, the mapping pattern includes one or more of a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, or a resource mapping between PTRS and DMRS communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
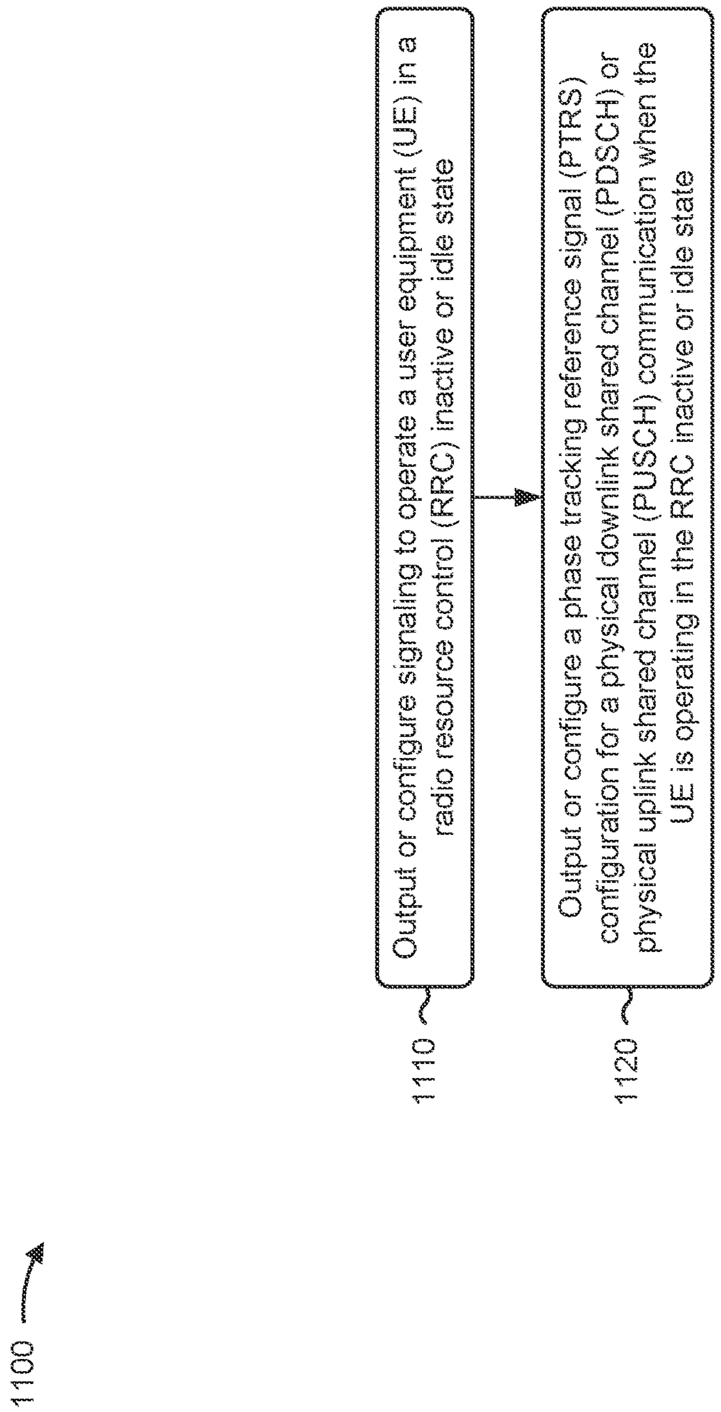
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110)

performs operations associated with PTRS configuration for a UE operating in a reduced capability state.

As shown in FIG. 11, in some aspects, process 1100 may include outputting or configuring signaling to operate a UE in an RRC inactive or idle state (block 1110). For example, the network node (e.g., using transmission component 1304 and/or communication manager 1306, depicted in FIG. 13) may output or configure signaling to operate a UE in an RRC inactive or idle state, as described above.

As further shown in FIG. 11, in some aspects, process 1100 may include outputting or configuring a PTRS configuration for a PDSCH or PUSCH communication when the UE is operating in the RRC inactive or idle state (block 1120). For example, the network node (e.g., using transmission component 1304 and/or communication manager 1306, depicted in FIG. 13) may output or configure a PTRS configuration for a PDSCH or PUSCH communication when the UE is operating in the RRC inactive or idle state, as described above.

Process 1100 may include additional aspects, such as any single aspect or any combination of aspects described below and/or in connection with one or more other processes described elsewhere herein.

In a first aspect, the PTRS configuration is based, at least in part, on one or more of a time density, a frequency density, a mapping rule to radio resources in one or more of a time domain, a frequency domain, or a space domain, a power allocation scheme, an antenna port association with a DMRS of the PDSCH or PUSCH communication, a threshold or range for a modulation coding scheme, a threshold or range for subcarrier spacing, or a bandwidth threshold or range for the PDSCH or PUSCH communication.

In a second aspect, alone or in combination with the first aspect, the signaling to operate in the RRC inactive state includes the PTRS configuration.

In a third aspect, alone or in combination with one or more of the first and second aspects, the PTRS configuration is transmitted via unicast RRC signaling.

In a fourth aspect, alone or in combination with one or more of the first through third aspects, the PTRS configuration is transmitted via one or more of a multicast or groupcast message.

In a fifth aspect, alone or in combination with one or more of the first through fourth aspects, the PTRS configuration is transmitted via a system information broadcast or on-demand transmission.

In a sixth aspect, alone or in combination with one or more of the first through fifth aspects, the PTRS configuration is transmitted via two or more of unicast RRC signaling, a multicast message, a groupcast message, or a system information broadcast or on-demand transmission.

In a seventh aspect, alone or in combination with one or more of the first through sixth aspects, the PTRS configuration is associated with an SDT configuration for one or more of uplink or downlink communications.

In an eighth aspect, alone or in combination with one or more of the first through seventh aspects, the SDT configuration is transmitted via RRC signaling.

In a ninth aspect, alone or in combination with one or more of the first through eighth aspects, the PTRS configuration is associated with one or more UE-specific procedure, UE group-specific procedure, cell-specific procedure, or area-specific procedure performed in the RRC inactive or idle state.

In a tenth aspect, alone or in combination with one or more of the first through ninth aspects, the one or more UE-specific procedure, UE group-specific procedure, cell-specific procedure, or area-specific procedure include one or more of a CBRA procedure, an SDT procedure, a positioning procedure, a sensing procedure, a joint sensing and communication procedure, a measurement or report procedure, a paging procedure, or a multicast and broadcast services procedure.

In an eleventh aspect, alone or in combination with one or more of the first through tenth aspects, configurations associated with the one or more UE-specific procedure, UE group-specific procedure, cell-specific procedure, or area-specific procedure are transmitted via one or more of unicast RRC signaling, a multicast message, a groupcast message, a system information on-demand transmission, or a system information broadcast.

In a twelfth aspect, alone or in combination with one or more of the first through eleventh aspects, the PTRS configuration includes one or more of a reference resource block index, a reference resource element index, a reference symbol index, or a resource element offset.

In a thirteenth aspect, alone or in combination with one or more of the first through twelfth aspects, one or more of the reference resource block index, the reference resource element index, the reference symbol index, or the resource element offset are configured as a function of an identifier associated with the UE.

In a fourteenth aspect, alone or in combination with one or more of the first through thirteenth aspects, the identifier associated with the UE includes one or more of a RNTI or a common control channel message.

In a fifteenth aspect, alone or in combination with one or more of the first through fourteenth aspects, the RNTI is one or more of a cell RNTI, a configured scheduling RNTI, or an inactive RNTI.

In a sixteenth aspect, alone or in combination with one or more of the first through fifteenth aspects, one or more of the reference resource block index, the reference resource element index, the reference symbol index, or the resource element offset are configured as a function of a group radio network temporary identifier scheduling physical downlink shared channel.

In a seventeenth aspect, alone or in combination with one or more of the first through sixteenth aspects, process 1100 includes receiving a PTRS availability indication via radio resource control signaling, medium access control layer control element signaling, random access response signaling, or downlink control information signaling.

In an eighteenth aspect, alone or in combination with one or more of the first through seventeenth aspects, process 1100 includes receiving a request for the PTRS.

In a nineteenth aspect, alone or in combination with one or more of the first through eighteenth aspects, the request for the PTRS is transmitted through radio resource control signaling, medium access control layer control element signaling, random access message, preamble, reference signal, uplink control information signaling, or a combination thereof.

In a twentieth aspect, alone or in combination with one or more of the first through nineteenth aspects, the request for the PTRS includes one of a request for the PTRS configuration or transmission of the PTRS, a request to modify the PTRS configuration, or a request to suspend availability of the PTRS.

In a twenty-first aspect, alone or in combination with one or more of the first through twentieth aspects, the request for PTRS is indicated via UE assistance information (UAI).

In a twenty-second aspect, alone or in combination with one or more of the first through twenty-first aspects, the request for PTRS is indicated via uplink control information.

In a twenty-third aspect, alone or in combination with one or more of the first through twenty-second aspects, the request for PTRS is transmitted via uplink control information on a dedicated physical uplink control channel resource set or multiplexed with the PUSCH communication.

In a twenty-fourth aspect, alone or in combination with one or more of the first through twenty-third aspects, process 1100 includes receiving a phase noise estimate based, at least in part, on one or more of a demodulation reference signal configured for a downlink control or data communication, an initial PTRS configuration, channel state information, a received signal strength indicator, or a signal-to-interference-plus-noise ratio.

In a twenty-fifth aspect, alone or in combination with one or more of the first through twenty-fourth aspects, the PTRS configuration is transmitted via a system information block configured for positioning, sensing, measurement, report, paging, or joint communication and sensing.

In a twenty-sixth aspect, alone or in combination with one or more of the first through twenty-fifth aspects, the PTRS configuration is based, at least in part, on a mapping pattern to time and frequency resources allocated for the PDSCH or PUSCH communication.

In a twenty-seventh aspect, alone or in combination with one or more of the first through twenty-sixth aspects, the mapping pattern defines a PTRS frequency density that is less than a frequency density of a DMRS of the PDSCH or PUSCH communication in the RRC inactive or idle state.

In a twenty-eighth aspect, alone or in combination with one or more of the first through twenty-seventh aspects, one or more of the PTRS frequency density or a PTRS time density are based, at least in part, on one or more of a UE capability, a modulation coding scheme, a bandwidth allocation, a sub-carrier spacing, a frequency range, availability or duty cycle of a synchronization signal block, or availability or duty cycle of a tracking reference signal.

In a twenty-ninth aspect, alone or in combination with one or more of the first through twenty-eighth aspects, one or more of the PTRS frequency density or PTRS time density are based, at least in part, on an availability or duty cycle of a synchronization signal block or an availability or duty cycle of a tracking reference signal.

In a thirtieth aspect, alone or in combination with one or more of the first through twenty-ninth aspects, the PTRS frequency density is less than or equal to a frequency density of a tracking reference signal.

In a thirty-first aspect, alone or in combination with one or more of the first through thirtieth aspects, the mapping pattern includes a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, a resource mapping between PTRS and DMRS communication, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
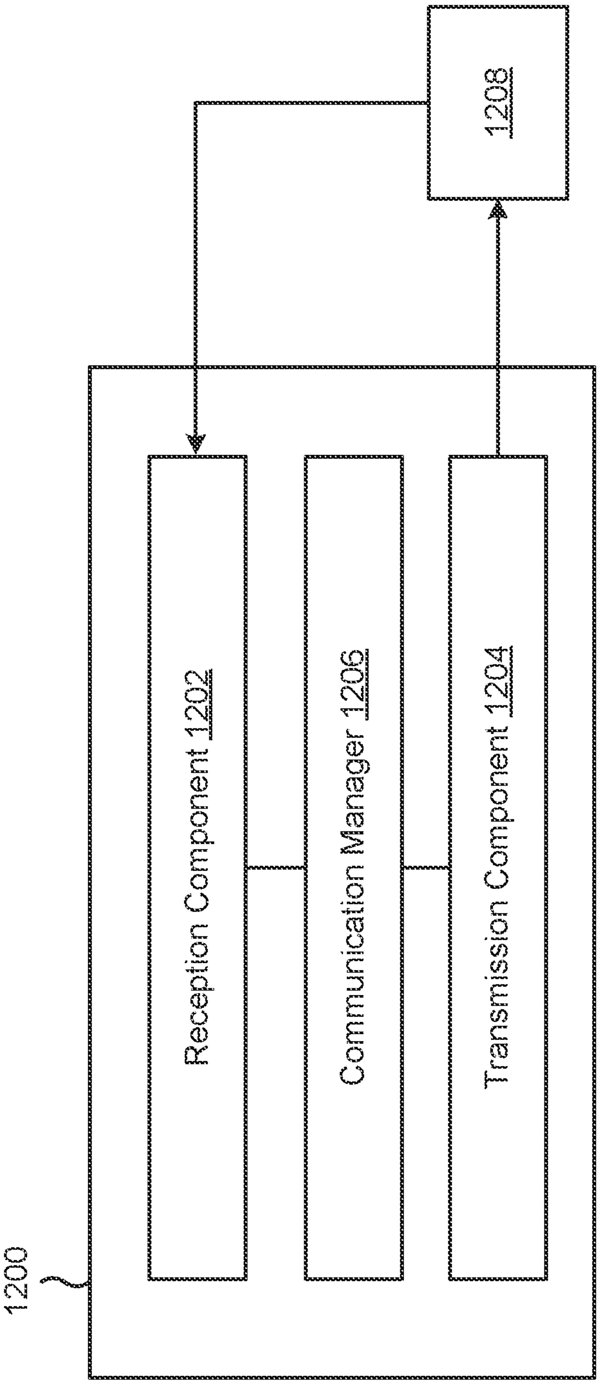
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive signaling to operate in an RRC inactive or idle state. The reception component 1202 may receive a PTRS configuration for a PDSCH or PUSCH communication when the UE is operating in the RRC inactive or idle state.

The reception component 1202 may receive a PTRS availability indication via radio resource control signaling, medium access control layer control element signaling, random access response signaling, or downlink control information signaling.

The transmission component 1204 may transmit a request for the PTRS.

The transmission component 1204 may transmit a phase noise estimate based, at least in part, on one or more of a demodulation reference signal configured for a downlink control or data communication, an initial PTRS configuration, channel state information, a received signal strength indicator, or a signal-to-interference-plus-noise ratio.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
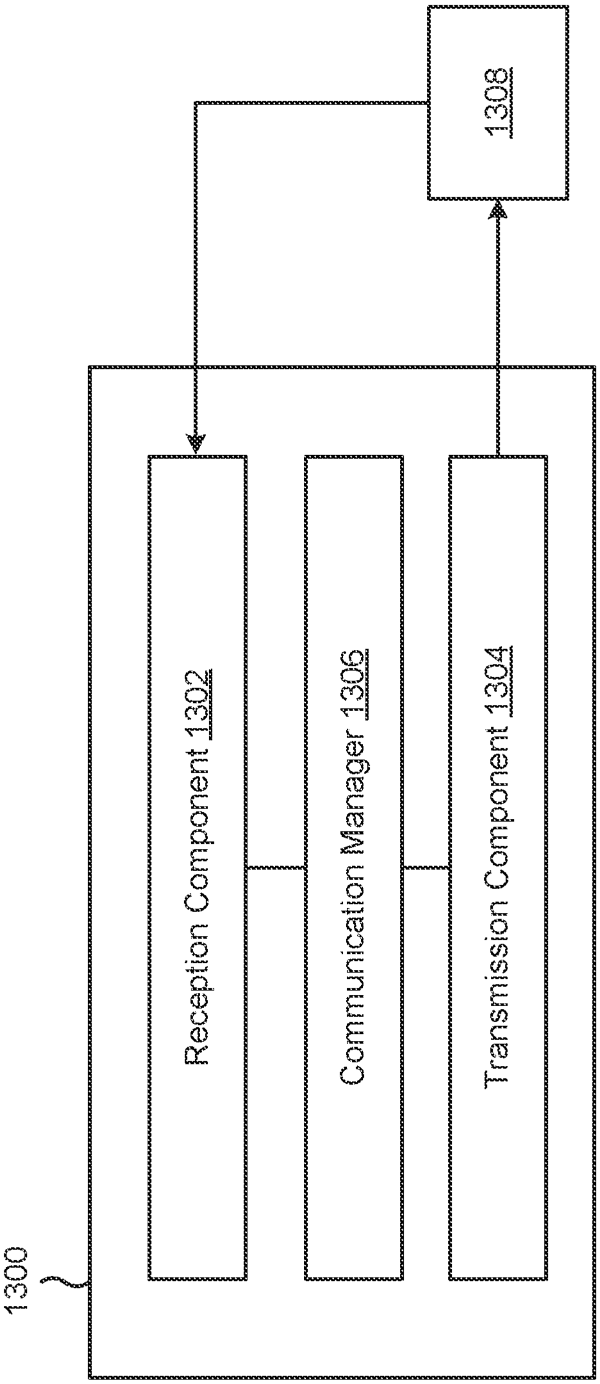
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may output or configure signaling to operate a UE in an RRC inactive or idle state. The transmission component 1304 may output or configure a PTRS configuration for a PDSCH or PUSCH communication when the UE is operating in the RRC inactive or idle state.

The reception component 1302 may receive a PTRS availability indication via radio resource control signaling, medium access control layer control element signaling, random access response signaling, or downlink control information signaling.

The reception component 1302 may receive a request for the PTRS.

The reception component 1302 may receive a phase noise estimate based, at least in part, on one or more of a demodulation reference signal configured for a downlink control or data communication, an initial PTRS configuration, channel state information, a received signal strength indicator, or a signal-to-interference-plus-noise ratio.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: receiving signaling to operate in an RRC inactive or idle state; and receiving a PTRS configuration for a PDSCH or PUSCH communication when the UE is operating in the RRC inactive or idle state.

Aspect 2: The method of Aspect 1, wherein the PTRS configuration is based, at least in part, on one or more of a time density, a frequency density, a mapping rule to radio resources in one or more of a time domain, a frequency domain, or a space domain, a power allocation scheme, an antenna port association with a DMRS of the PDSCH or PUSCH communication, a threshold or range for a modulation coding scheme, a threshold or range for subcarrier spacing, or a bandwidth threshold or range for the PDSCH or PUSCH communication.

Aspect 3: The method of any of Aspects 1-2, wherein the signaling to operate in the RRC inactive or idle state includes the PTRS configuration.

Aspect 4: The method of any of Aspects 1-3, wherein the PTRS configuration is transmitted via unicast RRC signaling.

Aspect 5: The method of any of Aspects 1-4, wherein the PTRS configuration is transmitted via one or more of a multicast or groupcast message.

Aspect 6: The method of any of Aspects 1-5, wherein the PTRS configuration is transmitted via a system information broadcast or on-demand transmission.

Aspect 7: The method of any of Aspects 1-6, wherein the PTRS configuration is transmitted via two or more of unicast RRC signaling, a multicast message, a groupcast message, or a system information broadcast or on-demand transmission.

Aspect 8: The method of any of Aspects 1-7, where the PTRS configuration is associated with an SDT configuration for one or more of uplink or downlink communications.

Aspect 9: The method of Aspect 8, wherein the SDT configuration is transmitted via RRC signaling.

Aspect 10: The method of any of Aspects 1-9, wherein the PTRS configuration is associated with one or more UE-specific procedures, UE group-specific procedures, cell-specific procedures, or area-specific procedures performed in the RRC inactive or idle state.

Aspect 11: The method of Aspect 10, wherein the one or more UE-specific procedures, UE group-specific procedures, cell-specific procedures, or area-specific procedures include one or more of a CBRA procedure, an SDT procedure, a positioning procedure, a sensing procedure, a joint sensing and communication procedure, a measurement or report procedure, a paging procedure, or a multicast and broadcast services procedure.

Aspect 12: The method of Aspect 11, wherein configurations associated with the one or more UE-specific procedures, UE group-specific procedures, cell-specific procedures, or area-specific procedures are received via one or more of unicast RRC signaling, a multicast message, a groupcast message, a system information on-demand transmission, or a system information broadcast.

Aspect 13: The method of any of Aspects 1-12, wherein the PTRS configuration includes one or more of a reference resource block index, a reference resource element index, a reference symbol index, or a resource element offset.

Aspect 14: The method of Aspect 13, wherein one or more of the reference resource block index, the reference resource element index, the reference symbol index, or the resource element offset are configured as a function of an identifier associated with the UE.

Aspect 15: The method of Aspect 14, wherein the identifier associated with the UE includes one or more of a RNTI or a common control channel message.

Aspect 16: The method of Aspect 15, wherein the RNTI is one or more of a cell RNTI, a configured scheduling RNTI, or an inactive RNTI.

Aspect 17: The method of Aspect 13, wherein one or more of the reference resource block index, the reference resource element index, the reference symbol index, or the resource element offset are configured as a function of a group radio network temporary identifier scheduling physical downlink shared channel.

Aspect 18: The method of any of Aspects 1-17, further comprising receiving a PTRS availability indication via radio resource control signaling, medium access control layer control element signaling, random access response signaling, or downlink control information signaling.

Aspect 19: The method of any of Aspects 1-18, further comprising transmitting a request for the PTRS.

Aspect 20: The method of Aspect 19, wherein the request for the PTRS is transmitted through one or more of radio resource control signaling, medium access control layer control element signaling, a random access message, a random access preamble, a reference signal, or uplink control information signaling.

Aspect 21: The method of Aspect 19, wherein the request for the PTRS includes one of a request for the PTRS configuration or transmission of the PTRS, a request to modify the PTRS configuration, or a request to suspend availability of the PTRS.

Aspect 22: The method of Aspect 19, wherein the request for PTRS is indicated via UE assistance information.

Aspect 23: The method of Aspect 19, wherein the request for PTRS is indicated via uplink control information.

Aspect 24: The method of Aspect 23, wherein the request for PTRS is transmitted via uplink control information on a dedicated physical uplink control channel resource set or multiplexed with the PUSCH communication.

Aspect 25: The method of Aspect 23, further comprising transmitting a phase noise estimate based, at least in part, on one or more of a demodulation reference signal configured for a downlink control or data communication, an initial PTRS configuration, channel state information, a received signal strength indicator, or a signal-to-interference-plus-noise ratio.

Aspect 26: The method of Aspect 19, wherein the PTRS configuration is received via a system information block configured for one or more of positioning, sensing, measuring, reporting, paging, or joint communication and sensing.

Aspect 27: The method of any of Aspects 1-26, wherein the PTRS configuration is based, at least in part, on a mapping pattern to time and frequency resources allocated for the PDSCH or PUSCH communication.

Aspect 28: The method of Aspect 27, wherein the mapping pattern defines a PTRS frequency density that is less than a frequency density of a DMRS of the PDSCH or PUSCH communication in the RRC inactive or idle state.

Aspect 29: The method of Aspect 28, wherein one or more of the PTRS frequency density or a PTRS time density are based, at least in part, on one or more of a UE capability, a modulation coding scheme, a bandwidth allocation, a sub-carrier spacing, a frequency range, availability or duty cycle of a synchronization signal block, or availability or duty cycle of a tracking reference signal.

Aspect 30: The method of Aspect 28, wherein one or more of the PTRS frequency density or PTRS time density are based, at least in part, on an availability or duty cycle of a synchronization signal block or an availability or duty cycle of a tracking reference signal.

Aspect 31: The method of Aspect 30, wherein the PTRS frequency density is less than or equal to a frequency density of a tracking reference signal.

Aspect 32: The method of Aspect 27, wherein the mapping pattern includes one or more of a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, or a resource mapping between PTRS and DMRS communication.

Aspect 33: A method of wireless communication performed by a network node, comprising: outputting or configuring signaling to operate a UE in an RRC inactive or idle state; and outputting or configuring a PTRS configuration for a PDSCH or PUSCH communication when the UE is operating in the RRC inactive or idle state.

Aspect 34: The method of Aspect 33, wherein the PTRS configuration is based, at least in part, on one or more of a time density, a frequency density, a mapping rule to radio resources in one or more of a time domain, a frequency domain, or a space domain, a power allocation scheme, an antenna port association with a DMRS of the PDSCH or PUSCH communication, a threshold or range for a modulation coding scheme, a threshold or range for subcarrier spacing, or a bandwidth threshold or range for the PDSCH or PUSCH communication.

Aspect 35: The method of any of Aspects 33-34, wherein the signaling to operate in the RRC inactive state includes the PTRS configuration.

Aspect 36: The method of any of Aspects 33-35, wherein the PTRS configuration is transmitted via unicast RRC signaling.

Aspect 37: The method of any of Aspects 33-36, wherein the PTRS configuration is transmitted via one or more of a multicast or groupcast message.

Aspect 38: The method of any of Aspects 33-37, wherein the PTRS configuration is transmitted via a system information broadcast or on-demand transmission.

Aspect 39: The method of any of Aspects 33-38, wherein the PTRS configuration is transmitted via two or more of unicast RRC signaling, a multicast message, a groupcast message, or a system information broadcast or on-demand transmission.

Aspect 40: The method of any of Aspects 33-39, where the PTRS configuration is associated with an SDT configuration for one or more of uplink or downlink communications.

Aspect 41: The method of Aspect 40, wherein the SDT configuration is transmitted via RRC signaling.

Aspect 42: The method of any of Aspects 33-41, wherein the PTRS configuration is associated with one or more UE-specific procedures, UE group-specific procedures, cell-specific procedures, or area-specific procedures performed in the RRC inactive or idle state.

Aspect 43: The method of Aspect 42, wherein the one or more UE-specific procedures, UE group-specific procedures, cell-specific procedures, or area-specific procedures include one or more of a CBRA procedure, an SDT procedure, a positioning procedure, a sensing procedure, a joint sensing and communication procedure, a measurement or report procedure, a paging procedure, or a multicast and broadcast services procedure.

Aspect 44: The method of Aspect 43, wherein configurations associated with the one or more UE-specific procedures, UE group-specific procedures, cell-specific procedures, or area-specific procedures are transmitted via one or more of unicast RRC signaling, a multicast message, a groupcast message, a system information on-demand transmission, or a system information broadcast.

Aspect 45: The method of any of Aspects 33-44, wherein the PTRS configuration includes one or more of a reference resource block index, a reference resource element index, a reference symbol index, or a resource element offset.

Aspect 46: The method of Aspect 45, wherein one or more of the reference resource block index, the reference resource element index, the reference symbol index, or the resource element offset are configured as a function of an identifier associated with the UE.

Aspect 47: The method of Aspect 46, wherein the identifier associated with the UE includes one or more of a RNTI or a common control channel message.

Aspect 48: The method of Aspect 47, wherein the RNTI is one or more of a cell RNTI, a configured scheduling RNTI, or an inactive RNTI.

Aspect 49: The method of Aspect 45, wherein one or more of the reference resource block index, the reference resource element index, the reference symbol index, or the resource element offset are configured as a function of a group radio network temporary identifier scheduling physical downlink shared channel.

Aspect 50: The method of any of Aspects 33-49, further comprising receiving a PTRS availability indication via radio resource control signaling, medium access control layer control element signaling, random access response signaling, or downlink control information signaling.

Aspect 51: The method of any of Aspects 33-50, further comprising receiving a request for the PTRS.

Aspect 52: The method of Aspect 51, wherein the request for the PTRS is transmitted through radio resource control signaling, medium access control layer control element signaling, random access message, preamble, reference signal, uplink control information signaling, or a combination thereof.

Aspect 53: The method of Aspect 51, wherein the request for the PTRS includes one of a request for the PTRS configuration or transmission of the PTRS, a request to modify the PTRS configuration, or a request to suspend availability of the PTRS.

Aspect 54: The method of Aspect 51, wherein the request for PTRS is indicated via UE assistance information (UAI).

Aspect No errors found. 55: The method of Aspect 51, wherein the request for PTRS is indicated via uplink control information.

Aspect 56: The method of Aspect 55, wherein the request for PTRS is transmitted via uplink control information on a dedicated physical uplink control channel resource set or multiplexed with the PUSCH communication.

Aspect 57: The method of Aspect 55, further comprising receiving a phase noise estimate based, at least in part, on one or more of a demodulation reference signal configured for a downlink control or data communication, an initial PTRS configuration, channel state information, a received signal strength indicator, or a signal-to-interference-plus-noise ratio.

Aspect 58: The method of Aspect 51, wherein the PTRS configuration is transmitted via a system information block configured for positioning, sensing, measurement, report, paging, or joint communication and sensing.

Aspect 59: The method of any of Aspects 33-58, wherein the PTRS configuration is based, at least in part, on a mapping pattern to time and frequency resources allocated for the PDSCH or PUSCH communication.

Aspect 60: The method of Aspect 59, wherein the mapping pattern defines a PTRS frequency density that is less than a frequency density of a DMRS of the PDSCH or PUSCH communication in the RRC inactive or idle state.

Aspect 61: The method of Aspect 60, wherein one or more of the PTRS frequency density or a PTRS time density are based, at least in part, on one or more of a UE capability, a modulation coding scheme, a bandwidth allocation, a sub-carrier spacing, a frequency range, availability or duty cycle of a synchronization signal block, or availability or duty cycle of a tracking reference signal.

Aspect 62: The method of Aspect 60, wherein one or more of the PTRS frequency density or PTRS time density are based, at least in part, on an availability or duty cycle of a synchronization signal block or an availability or duty cycle of a tracking reference signal.

Aspect 63: The method of Aspect 62, wherein the PTRS frequency density is less than or equal to a frequency density of a tracking reference signal.

Aspect 64: The method of Aspect 59, wherein the mapping pattern includes a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, a resource mapping between PTRS and DMRS communication, or a combination thereof.

Aspect 65: An apparatus for wireless communication at a device, comprising a processor; memory coupled with the processor; and instructions stored in the memory and executable by the processor to cause the apparatus to perform the method of one or more of Aspects 1-64.

Aspect 66: A device for wireless communication, comprising a memory and one or more processors coupled to the memory, the one or more processors configured to perform the method of one or more of Aspects 1-64.

Aspect 67: An apparatus for wireless communication, comprising at least one means for performing the method of one or more of Aspects 1-64.

Aspect 68: A non-transitory computer-readable medium storing code for wireless communication, the code comprising instructions executable by a processor to perform the method of one or more of Aspects 1-64.

Aspect 69: A non-transitory computer-readable medium storing a set of instructions for wireless communication, the set of instructions comprising one or more instructions that, when executed by one or more processors of a device, cause the device to perform the method of one or more of Aspects 1-64.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memory; and one or more processors, coupled to the one or more memories, configured to:

receive signaling to operate in a radio resource control (RRC) inactive or idle state;

receive a phase tracking reference signal (PTRS) configuration for a physical downlink shared channel (PDSCH) or physical uplink shared channel (PUSCH) communication when the UE is operating in the RRC inactive or idle state; and transmit a request for the PTRS based on the received PTRS configuration.

2. The UE of claim 1, wherein the signaling to operate in the RRC inactive or idle state includes the PTRS configuration.

3. The UE of claim 1, where the PTRS configuration is associated with a small data transmission (SDT) configuration for one or more of uplink or downlink communications.

4. The UE of claim 3, wherein the SDT configuration is transmitted via RRC signaling.

5. The UE of claim 1, wherein the PTRS configuration is associated with one or more UE-specific procedures, UE group-specific procedures, cell-specific procedures, or area-specific procedures performed in the RRC inactive or idle state.

6. The UE of claim 5, wherein the one or more UE-specific procedures, UE group-specific procedures, cell-specific procedures, or area-specific procedures include one or more of a contention based random access (CBRA) procedure, a small data transmission (SDT) procedure, a positioning procedure, a sensing procedure, a joint sensing and communication procedure, a measurement or report procedure, a paging procedure, or a multicast and broadcast services procedure.

7. The UE of claim 1, wherein the request for the PTRS is transmitted through one or more of radio resource control signaling, medium access control layer control element signaling, a random access message, a random access preamble, a reference signal, or uplink control information signaling.

8. The UE of claim 1, wherein the request for the PTRS includes one of a request for the PTRS configuration or transmission of the PTRS, a request to modify the PTRS configuration, or a request to suspend availability of the PTRS.

9. The UE of claim 1, wherein the request for PTRS is indicated via UE assistance information.

10. The UE of claim 1, wherein the request for PTRS is indicated via uplink control information.

11. The UE of claim 10, wherein the request for PTRS is transmitted via uplink control information on a dedicated physical uplink control channel resource set or multiplexed with the PUSCH communication.

12. The UE of claim 10, wherein the one or more processors are further configured to transmit a phase noise estimate based, at least in part, on one or more of a demodulation reference signal configured for a downlink control or data communication, an initial PTRS configuration, channel state information, a received signal strength indicator, or a signal-to-interference-plus-noise ratio.

13. The UE of claim 1, wherein the PTRS configuration is received via a system information block configured for one or more of positioning, sensing, measuring, reporting, paging, or joint communication and sensing.

14. The UE of claim 1, wherein the PTRS configuration is based, at least in part, on a mapping pattern to time and frequency resources allocated for the PDSCH or PUSCH communication.

15. The UE of claim 14, wherein the mapping pattern defines a PTRS frequency density that is less than a frequency density of a demodulation reference signal (DMRS) of the PDSCH or PUSCH communication in the RRC inactive or idle state.

16. The UE of claim 15, wherein one or more of the PTRS frequency density or a PTRS time density are based, at least in part, on one or more of a UE capability, a modulation coding scheme, a bandwidth allocation, a sub-carrier spacing, a frequency range, availability or duty cycle of a synchronization signal block, or availability or duty cycle of a tracking reference signal.

17. The UE of claim 15, wherein one or more of the PTRS frequency density or PTRS time density are based, at least in part, on an availability or duty cycle of a synchronization signal block or an availability or duty cycle of a tracking reference signal.

18. The UE of claim 17, wherein the PTRS frequency density is less than or equal to a frequency density of a tracking reference signal.

19. The UE of claim 14, wherein the mapping pattern includes one or more of a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, or a resource mapping between PTRS and DMRS communication.

20. A network node for wireless communication, comprising:

one or more memories; and one or more processors, coupled to the one or more memories, configured to:

output or configure signaling to operate a user equipment (UE) in a radio resource control (RRC) inactive or idle state;

output or configure a phase tracking reference signal (PTRS) configuration for a physical downlink shared channel (PDSCH) or physical uplink shared channel (PUSCH) communication when the UE is operating in the RRC inactive or idle state; and receive a request for the PTRS based on the outputted PTRS configuration.

21. The network node of claim 20, wherein the request for the PTRS is transmitted through radio resource control signaling, medium access control layer control element signaling, random access message, preamble, reference signal, uplink control information signaling, or a combination thereof.

22. The network node of claim 20, wherein the PTRS configuration is based, at least in part, on a mapping pattern to time and frequency resources allocated for the PDSCH or PUSCH communication.

23. The network node of claim 22, wherein the mapping pattern defines a PTRS frequency density that is less than a frequency density of a demodulation reference signal (DMRS) of the PDSCH or PUSCH communication in the RRC inactive or idle state.

24. The network node of claim 22, wherein the mapping pattern includes a time-varying resource element offset for PTRS communication across multiple symbols allocated for PDSCH or PUSCH communication, a reference resource block index for PTRS communication, a reference resource element index for PTRS communication, a reference symbol index for PTRS communication, a time duration of PTRS communication, a power control scheme for PTRS communication, a resource mapping between PTRS and DMRS communication, or a combination thereof.

25. A method of wireless communication performed by a user equipment (UE), comprising:

receiving signaling to operate in a radio resource control (RRC) inactive or idle state;

receiving a phase tracking reference signal (PTRS) configuration for a physical downlink shared channel (PDSCH) or physical uplink shared channel (PUSCH) communication when the UE is operating in the RRC inactive or idle state; and transmit a request for the PTRS based on the received PTRS configuration.

26. The method of claim 25, wherein the PTRS configuration is based, at least in part, on a mapping pattern to time and frequency resources allocated for the PDSCH or PUSCH communication.

27. A method of wireless communication performed by a network node, comprising:

outputting or configuring signaling to operate a user equipment (UE) in a radio resource control (RRC) inactive or idle state;

outputting or configuring a phase tracking reference signal (PTRS) configuration for a physical downlink shared channel (PDSCH) or physical uplink shared channel (PUSCH) communication when the UE is operating in the RRC inactive or idle state; and receive a request for the PTRS based on the outputted PTRS configuration.

* * * * *